US012212059B2

(12) United States Patent
Ramasamy et al.

(10) Patent No.: US 12,212,059 B2
(45) Date of Patent: Jan. 28, 2025

(54) SYSTEM AND METHOD FOR OPERATING A PARTITIONED ANTENNA AT A VENT FORMED IN A BOTTOM METAL CHASSIS

(71) Applicant: Dell Products, LP, Round Rock, TX (US)

(72) Inventors: Suresh K. Ramasamy, Cedar Park, TX (US); Sumana Pallampati, Austin, TX (US); Changsoo Kim, Cedar Park, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 226 days.

(21) Appl. No.: 17/236,361

(22) Filed: Apr. 21, 2021

(65) Prior Publication Data

US 2022/0344825 A1 Oct. 27, 2022

(51) Int. Cl.

| | |
|---|---|
| ***H01Q 13/10*** | (2006.01) |
| ***H01Q 1/22*** | (2006.01) |
| ***H01Q 1/48*** | (2006.01) |
| ***H04R 1/02*** | (2006.01) |
| ***H04R 1/34*** | (2006.01) |

(52) U.S. Cl.

CPC ........... *H01Q 13/10* (2013.01); *H01Q 1/2258* (2013.01); *H01Q 1/48* (2013.01); *H04R 1/028* (2013.01); *H04R 1/345* (2013.01); *H04R 2499/15* (2013.01)

(58) Field of Classification Search

CPC ...... H04R 1/028; H04R 1/345; H04R 1/2826; H01Q 1/2258–2266; H01Q 13/10

See application file for complete search history.

(56) References Cited

U.S. PATENT DOCUMENTS

| | | | | |
|---|---|---|---|---|
| 5,349,362 | A | 9/1994 | Forbes | |
| 9,419,328 | B2 | 8/2016 | Mo | |
| 9,728,858 | B2 * | 8/2017 | Zhu | H01Q 1/243 |
| 10,074,887 | B2 | 9/2018 | Nivet | |
| 10,862,190 | B1 | 12/2020 | Ramasamy | |
| 10,938,113 | B1 | 3/2021 | Kim | |
| 11,031,674 | B1 * | 6/2021 | Ramasamy | H01Q 1/2266 |
| 2005/0146475 | A1 * | 7/2005 | Bettner | G06F 1/1616 343/702 |
| 2006/0244663 | A1 * | 11/2006 | Fleck | G06F 1/1698 343/702 |
| 2010/0088924 | A1 | 4/2010 | Monk | |

(Continued)

FOREIGN PATENT DOCUMENTS

| | | | | |
|---|---|---|---|---|
| CN | 116031641 A | * | 3/2022 | H01Q 1/42 |
| TW | 202211542 A | * | 3/2022 | H01Q 1/48 |
| WO | WO-2021169500 A1 | * | 9/2021 | G06F 3/03545 |

*Primary Examiner* — Ricardo I Magallanes

(74) *Attorney, Agent, or Firm* — Prol Intellectual Property Law, PLLC; H. Kenneth Prol

(57) ABSTRACT

An information handling system to wirelessly transmit and receive data at an antenna may include a processor; a memory; a power management unit; a bottom metal chassis of a base housing containing components of the information handling system; a vent formed into the bottom metal chassis; a slot formed between the vent and a terminal edge of the bottom metal chassis; and an antenna located within the bottom metal chassis and behind the vent to, upon execution of the processor, create radiating radio frequency (RF) bands along an edge of the vent.

20 Claims, 12 Drawing Sheets

(56) References Cited

U.S. PATENT DOCUMENTS

2010/0231481 A1* 9/2010 Chiang .................... H01Q 9/42 343/702
2012/0044116 A1* 2/2012 Chiang ................ H01Q 1/2266 343/767
2012/0074988 A1* 3/2012 Lashkari ............. H04L 25/0264 327/109
2012/0194393 A1* 8/2012 Uttermann ............. H01Q 1/526 343/702
2012/0241140 A1* 9/2012 MacDonald ............ G06F 1/206 165/278
2013/0027263 A1* 1/2013 Gocho ................. H01Q 13/203 343/784
2014/0062798 A1 3/2014 Lin
2014/0085161 A1* 3/2014 Zhu ........................ H01Q 5/378 343/867
2014/0086441 A1* 3/2014 Zhu .......................... H01Q 7/00 343/866
2014/0111388 A1* 4/2014 Di Nallo .................. H01Q 9/42 343/702
2014/0184451 A1* 7/2014 Kuo ....................... H01Q 1/243 343/702
2015/0236426 A1* 8/2015 Zhu ........................ H01Q 13/10 343/702
2015/0255851 A1* 9/2015 Guterman ................ H01Q 9/42 343/702
2016/0294067 A1* 10/2016 Chang .................... H01Q 5/364
2016/0351995 A1* 12/2016 Huang ................... H01Q 1/243
2017/0194709 A1* 7/2017 Jansson .................. H01Q 13/18
2017/0212554 A1* 7/2017 Guterman ............. G06F 1/1681
2017/0331189 A1* 11/2017 Wang ..................... H01Q 5/364
2018/0006354 A1* 1/2018 Nivet .................... G06F 1/1698
2018/0026341 A1* 1/2018 Mow ...................... H01Q 1/243 343/702
2018/0040940 A1* 2/2018 Bologna .................. H01Q 1/50
2018/0090817 A1* 3/2018 Rajagopalan ........ H01Q 1/2291
2019/0027808 A1* 1/2019 Mow ........................ H04R 5/04
2019/0036223 A1* 1/2019 Wu ...................... H01Q 13/106
2019/0237847 A1* 8/2019 Wu .......................... H01Q 9/42
2019/0237848 A1* 8/2019 Ramasamy ........... G06F 1/1683
2019/0356051 A1* 11/2019 Barrera .................... H01Q 1/44
2019/0393587 A1* 12/2019 Yong ...................... H01Q 1/243
2020/0044316 A1* 2/2020 Ruaro .................... H01Q 1/243
2020/0127384 A1* 4/2020 Thakur ................ H01Q 1/2266
2020/0203804 A1* 6/2020 Khripkov ............... H01Q 1/243
2020/0243947 A1* 7/2020 Yamamoto ............. H01Q 1/526
2021/0055767 A1 2/2021 Chang
2021/0126345 A1* 4/2021 Yoo .......................... H01Q 1/38
2021/0175608 A1* 6/2021 Ramasamy .......... H01Q 1/2266
2021/0175610 A1* 6/2021 Ramasamy .......... H01Q 1/2266
2021/0211167 A1* 7/2021 Ramasamy .......... H04B 7/0608
2021/0218135 A1* 7/2021 Ramasamy ............ H04R 1/023
2021/0391651 A1* 12/2021 Hasnat ................... H01Q 13/22
2021/0408665 A1* 12/2021 Lee .......................... H01Q 3/30
2022/0320740 A1* 10/2022 Chang ...................... H01Q 9/42
2022/0352625 A1* 11/2022 Wu .......................... H01Q 1/48

* cited by examiner

300

SYSTEM AND METHOD FOR OPERATING A PARTITIONED ANTENNA AT A VENT FORMED IN A BOTTOM METAL CHASSIS

FIELD OF THE DISCLOSURE

The present disclosure generally relates to information handling systems, and more particularly relates to an information handling system including an antenna formed at a vent within a chassis of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system that allows the information handling system to be operatively coupled to a wireless communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
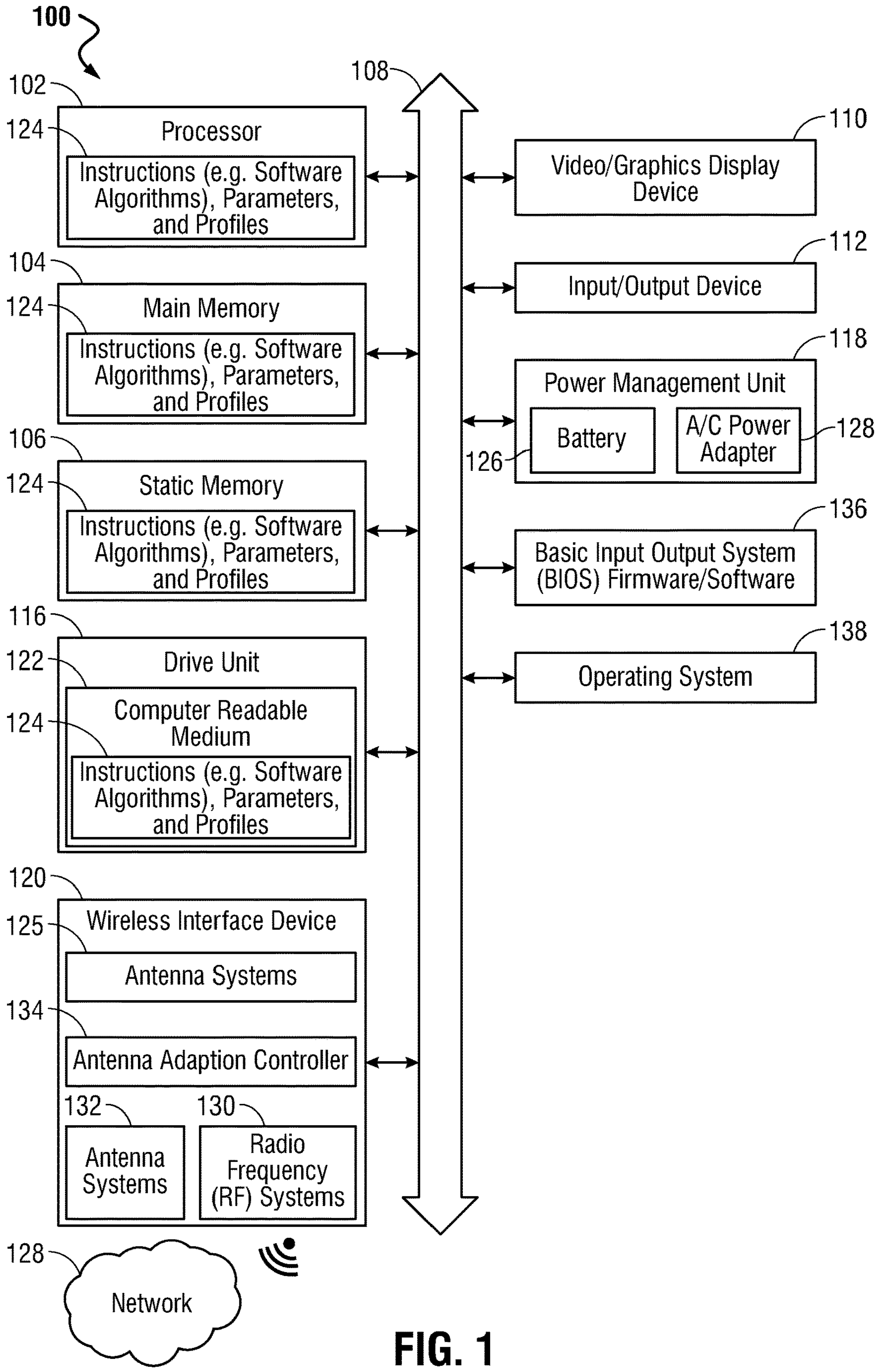
FIG. 1 is a block diagram of an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts are more commonly designed with a metal structure. In an example embodiment, a laptop information handling system may include a plurality of metal covers for the interior components of the information handling system. For example, a small form factor case may include a back metal display cover referred to herein as an A-cover which serves as a back metal cover for a metal display housing. The metal display housing may also include a front display cover referred herein as a B-cover which may serve as the bezel, if any, and a display screen of the convertible laptop information handling system in an embodiment. In a further example, the information handling system chassis parts may include a base metal housing that includes a keyboard metal chassis referred herein as a metal C-cover used to house a keyboard, touchpad, and any cover in which these components are set. The base metal housing may also include a metal bottom chassis referred herein to also as a D-cover forming a base housing for the convertible information handling system. With the need for utility of lighter, thinner, and more streamlined devices, the use of full metal portions for the outer covers of the display and base housing (e.g., the A-cover and the D-cover) is desirable for strength as well as aesthetic reasons. At the same time, the demands for wireless operation also increase. This includes addition of many simultaneously operating radiofrequency systems, addition of more antennas, and utilization of various antenna types that are being developed for use with hardware associated with 5G communications. However, the thinner and more streamlined devices have fewer locations and area available for mounting radiofrequency transmitters (e.g., antennas) on these mobile information handling systems and especially in the display housing that includes the A-cover and B-cover. Thus, a streamlined, full metal chassis capable of meeting the increasing wireless operation demands is needed.

Previous information handling systems would address these competing needs by providing for cutout portions of a metal outer chassis cover filled with plastic behind which radio transmitters would be mounted. The cutouts to accommodate radio frequency (RF) transmitters were often located in aesthetically undesirable locations or required additional plastic components to cover the cutout, thus not fully meeting the streamlining needs. The plastic components added a component to be manufactured and were required to be seamlessly integrated into an otherwise smooth metal chassis cover. Further, the plastic portions included may be more expensive to machine than aluminum alloy metals, and may require intricate multi-step processes for integrating the metal and plastic parts into a single chassis. This requirement could require difficult and expensive processes to manufacture with a less desirable result. Other options included, for aperture type antenna transmitters, creation of an aperture in the metal display panel chassis and using the metal chassis as a ground plane for excitation of the aperture. Similarly, the visible apertures in the chassis cover were also less desirable, and the radio frequency (RF) transmission hotspot would be located on the metal chassis cover itself.

In addition, in the case of the convertible laptop information handling system, 360-degree configurability may be a feature available to a user during use. Thus, often an antenna such as an aperture antenna system would be located at the top (e.g., A-cover) with a plastic antenna window in a metal chassis cover to radiate in 360-degree mode (such as closed mode), or at the base (e.g., between the C and D-cover) to radiate in 360-degree mode (such as open mode). Such a configuration could make the display panel housing or the base panel housing thicker, to accommodate antennas, circuit boards, or cables behind the plastic panel at the top, bottom, or elsewhere on either housing. Overall, an additional of a plastic antenna window in an A-cover or C-cover may not meet the streamlining needs or may be aesthetically undesirable. A solution is needed that does not increase the thickness of the metal chassis, and does not require additional components and manufacturing steps such as those associated with installation of RF transparent windows.

Embodiments of the present disclosure may decrease the complexity and cost of creating chasses for information handling systems by forming the outer chassis (e.g., the D-cover) entirely of metal and co-locating an antenna with a vent formed therein. In an embodiment, this vent may be an audio vent and/or a thermal vent that is used to transmit audio waves from a speaker or dissipate heat out of the information handling system, respectively. This placement of the antenna at a location along with either the audio vent or thermal vent allows the antenna to be placed at a location that provides for a relatively more streamlined information handling system and conserve space in the base chassis as described herein. Additionally, regardless of the orientation of the information handling system, the antenna receipt and transmission strength may remain constant. Still further, the vent (e.g., audio vent or thermal vent) includes a slot formed between the vent and a terminal edge of the bottom metal chassis (e.g., the D-cover) so that the antenna uses the metal of the bottom metal chassis of create radiating RF bands along edges of the vent. This allows the vent to be used for a dual purpose thereby placing multiple components of the information handling system at a single location and conserving additional space within the information handling system for other potential components.

The metal chassis in embodiments described herein may include a hinge operably connecting the A-cover to the D-cover such that the keyboard and touchpad enclosed within the C-cover and attached to the D-cover may be placed in a plurality of configurations with respect to the digital display enclosed within the B-cover and attached to the A-cover. The plurality of configurations may include, but may not be limited to, an open configuration in which the A-cover is oriented at a right or obtuse angle from the D-cover (similar to an open laptop computer), a closed configuration in which the A-cover lies substantially parallel to the D-cover (similar to a closed laptop computer), and a tablet configuration in which the A-cover is rotated nearly 360 degrees from its closed orientation (placing the D-cover directly beneath the A-cover, such that the user can interact with the digital display enclosed within the B-cover and A-cover of the display housing) or other orientations such as an easel orientation. Despite these different configurations, however, the antenna vent co-located with one or both of the audio vent and thermal vent provides for the streamlining of the information handling system without compromising the ability of the antenna to transmit and receive data from and to the information handling system.

Manufacture of embodiments of the present disclosure may involve fewer extraneous parts than previous chassis by forming the exterior or outer portions of the information handling system, including the bottom portion of the D-cover and the top portion of the A-cover, entirely from metal. In order to allow for manufacture of fully metallic outer chasses including the A-cover and the D-cover, embodiments of the present disclosure enclosing the information handling system such that one or more transmitting antennas may be formed within the vent or plural vents of the base metal chassis (i.e., D-cover).

Still further, the vent described herein may include one or more grounding walls surrounding the antenna feed placed behind it. The grounding walls may be used to facilitate the resonant functionalities described herein at the slot. The slot builds a distributed capacitance that helps tune and match the antenna tuning of the vent edges without having the need for discrete lumped elements soldered on to the structure which drives the cost of the construction of the antenna by avoiding to have surface mount technology (SMT) parts. This, thereby, partitions a side wall without having to break a long slot on the side wall, by moving the long side wall slot to the D-cover thereby leveraging the vent and conceal the antenna as opposed to dedicated side wall slots or apertures that decreases the aesthetics, space efficiency, and user experience.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 is a block diagram of an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a microcontroller unit (MCU) operating both firmware instructions or hardwired instructions for the antenna adaptation controller 134 to achieve WLAN or WWAN communications according to embodiments disclosed herein. The application programs operating on the information handling system 100 may communicate or otherwise operate via concurrent wireless links, individual wireless links, or combinations over any available radio access technology (RAT) protocols including WLAN protocols. These application programs may operate in some example embodiments as software, in whole or in part, on an information handling system while other portions of the software applications may operate on remote server systems. An antenna adaptation controller 134 of the presently disclosed embodiments may operate as firmware or hardwired circuitry or any combination on controllers or processors within the information handing system 100 for interface with components of a wireless interface adapter 120. It is understood that some aspects of the antenna adaptation controller 134 described herein may interface or operate as software or via other controllers associated with the wireless interface adapter 120 or elsewhere within information handling system 100. Information handling system 100 may also represent a networked server or other system from which some software applications are administered or which wireless communications such as across WLAN or WWAN may be conducted. In other aspects, networked servers or systems may operate the antenna adaptation controller 134 for use with a wireless interface adapter 120 on those devices similar to embodiments for WLAN or WWAN antenna optimization operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video/graphic display device 110, such as a liquid crystal display (LCD), an organic light emitting diode (OLED), a flat panel display, a solid-state display, or a cathode ray tube (CRT). The video/graphic display device 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input/output device 112, such as a keyboard, a printer, and a cursor control device, such as a mouse or touchpad or similar peripheral input device. The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), the video/graphic display device 110, and other components that may require power when a power button has been actuated by a user. In an embodiment, the PMU 118 may be electrically coupled to the information handling system to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

In an embodiment, the information handling system 100 can also represent a server device whose resources can be shared by multiple client devices in an embodiment. In another embodiment, the information handling system 100 may represent an individual client device, such as a desktop personal computer, a laptop computer, a tablet computer, a 360-degree convertible device, a wearable computing device, or a mobile smart phone that communicates to a network 128 via the wireless interface adapter 120 and its associated antenna systems 132 as described herein.

The information handling system 100 can include sets of instructions 124 that can be executed to cause the computer system to perform any one or more desired applications. In many aspects, sets of instructions 124 may implement wireless communications via one or more antenna systems 132 available on information handling system 100. Operation of WLAN and WWAN wireless communications may be enhanced or otherwise improved via WLAN or WWAN antenna operation adjustments via the methods or controller-based functions relating to the antenna adaptation controller 134 disclosed herein. For example, instructions or a controller may execute software or firmware applications or algorithms which utilize one or more wireless signal parameters via the wireless adapter interface for wireless communications via the wireless interface adapter as well as other aspects or components. The antenna adaptation controller 134 may execute instructions as disclosed herein for monitoring wireless link state information, information handling system configuration data, SAR proximity sensor detection, or other input data to generate channel estimation and determine antenna radiation patterns. In the embodiments presented herein, the antenna adaptation controller 134 may execute instructions as disclosed herein to transmit a communications signal from an antenna located with a vent, create radiating radio frequency (RF) bands along edges of the vent due to a slot being formed between the vent and a terminal edge of the bottom metal chassis (e.g., D-cover). In the embodiments presented herein, the antenna adaptation controller 134 may execute instructions as disclosed herein to adjust, via a parasitic coupling element for example, change the band, directionality, and/or pattern of the emitted RF signals from the antenna system 132. The antenna adaptation controller 134 may implement adjustments to wireless antenna systems and resources via a radio frequency integrated circuit (RFIC) front end 125 and WLAN or WWAN radio module systems within the wireless interface device 120. Aspects of the antenna optimization for the antenna adaptation controller 134 may be included as part of an antenna front end 125 in some aspects or may be included with other aspects of the wireless interface device 120 such as WLAN radio module such as part of the RF systems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns and parasitic coupling element operations. Multiple WLAN or WWAN antenna systems may operate on various communication frequency bands such as under IEEE 802.11a, IEEE 802.11g, 4G LTE eNodeB, or 5G LTE gNodeB providing multiple band options for frequency channels. Further antenna radiation patterns and selection of antenna options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects WLAN antenna adaptation controller may execute firmware algorithms or hardware to regulate operation of the one or more antenna systems 132 such as WLAN antennas in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used.

Various software modules comprising software application instructions 124 or firmware instructions may be coordinated by an operating system (OS) 138 and via an application programming interface (API). An example OS 138 may include Windows®, Android®, and other OS 138 types known in the art. Example APIs may include Win 32®, Core Java® API, Android® APIs, or wireless adapter driver API. In a further example, processor 102 may conduct processing of mobile information handling system applications by the information handling system 100 according to the systems and methods disclosed herein which may utilize wireless communications. In the embodiments, the OS 138 may be bootstrapped using a basic input/output system (BIOS) firmware/software 136 to initiate a user interface with the user. The computer system 100 may operate as a standalone device or may be connected such as using a network, to other computer systems or peripheral devices. In other aspects, additional processor or control logic may be implemented in graphical processor units (GPUs) or controllers located with radio modules or within a wireless adapter 120 to implement method embodiments of the antenna adaptation controller and antenna optimization according to embodiments herein. Code instructions 124 in firmware, hardware or some combination may be executed to implement operations of the antenna adaptation controller and antenna optimization on control logic or processor systems within the wireless adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless interface adapter 120. Further, the instructions 124 that embody one or more of the methods or logic as described herein. For example, instructions relating to the antenna adaptation system or antenna adjustments described in embodiments herein may be stored here or transmitted to local memory located with the antenna adaptation controller 134, antenna front end 125, or wireless module in radiofrequency (RF) subsystem 130 in the wireless interface adapter 120.

In a particular embodiment, the instructions, parameters, and profiles 124 may reside completely, or at least partially, within a memory, such as non-volatile static memory, during execution of antenna adaptation by the antenna adaptation controller 134 in wireless interface adapter 132 of information handling system 100. As explained, some or all of the antenna adaptation and antenna optimization may be executed locally at the antenna adaptation controller 134, RF front end 125, or wireless module subsystem 130. Some aspects may operate remotely among those portions of the wireless interface adapter 120 or with the main memory 104 and the processor 102 in parts including the computer-readable media in some embodiments.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other types of networks. Connectivity may be via wired or wireless connection. Wireless adapter 120 may include one or more RF systems 130 with transmitter/receiver circuitry, modem circuitry, one or more antenna front end circuits 125, one or more wireless controller circuits such as antenna adaptation controller 134, amplifiers, antenna systems 132 and other RF subsystem circuitry 130 for wireless communications via multiple radio access technologies. Each RF subsystem 130 may communicate with one or more wireless technology protocols. The RF subsystem 130 may contain individual subscriber identity module (SIM) profiles for each technology service provider and their available protocols for subscriber-based radio access technologies such as cellular LTE communications. The wireless adapter 120 may also include antenna systems 132 which may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures.

In some aspects of the present disclosure, a wireless adapter 120 may operate one or more wireless links. In a further aspect, the wireless adapter 120 may operate the two or more wireless links with a single, shared communication frequency band such as with the Wi-Fi WLAN operation or 5G LTE standard WWAN operations in an example aspect. For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through an antenna of the antenna systems 132. Other communication frequency bands are contemplated for use with the embodiments of the present disclosure as well.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 and antenna adaptation controller 134 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. It is understood that any number of available channels may be available under the 5 GHz shared communication frequency band for WLAN. WLAN, in another example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the new radio frequency range 1 (NRFR1), NFRF2, bands, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more RF systems 130 including transmitters and wireless controllers such as wireless module subsystems for connecting via a multitude of wireless links under a variety of protocols. In an example embodiment, an information handling system may have an antenna system 132 transmitter for 5G small cell WWAN, Wi-Fi WLAN or WiGig connectivity and one or more additional antenna system 132 transmitters for macro-cellular communication. The RF systems 130 include wireless controllers to manage authentication, connectivity, communications, power levels for transmission, buffering, error correction, baseband processing, and other functions of the wireless adapter 120.

The RF systems 130 of the wireless adapters may also measure various metrics relating to wireless communication pursuant to operation of an antenna system as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WLAN links operating on one or more antenna systems 132, may be used by the antenna adaptation controller 134 to adapt the antenna systems 132 according to an antenna adaptation network. In an embodiment, a wireless controller of a wireless interface adapter 120 may manage one or more RF systems 130. The wireless controller also manages transmission power levels which directly affect RF subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more antenna systems 132.

The wireless network 128 may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs, and BIOS firmware/software 136. BIOS firmware/software 136 functions to initialize information handling system 100 on power up, to launch an OS 138, and to manage input and output interactions between the operating system and the other elements of information handling system 100. In a particular embodiment, BIOS firmware/software 136 reside in memory 104, and include machine-executable code that is executed by processor 102 to perform various functions of information handling system 100. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS firmware/software 136 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
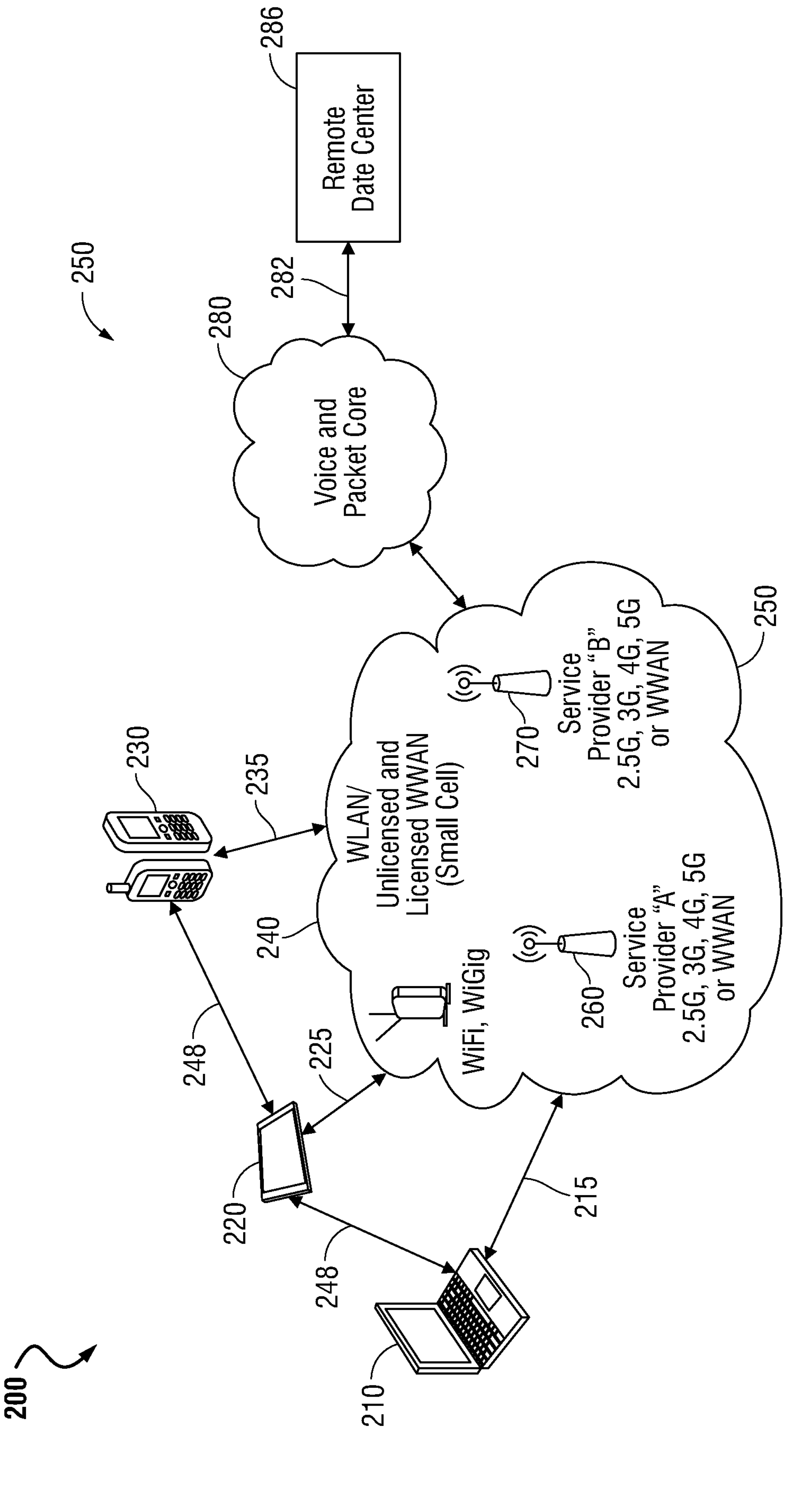
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as gNodeB, eNodeB, or similar wireless network protocols and access points. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. It is understood that any number of available channels may be available under the 5 GHz shared communication frequency band for WLAN. WLAN, in another example, may also operate at various channels in a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1 and NFRF2, bands, and other known bands in sub-6 GHz or greater than 6 GHz bands. In the example embodiment, mobile information handling systems 210, 220, and 230 include both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas in embodiments herein. Alternatively, embodiments may include a single transceiving antennas capable of receiving and transmitting, and/or more than one transceiving antennas. Each of the antennas included in the information handling system 100 in an embodiment may be subject to the FCC regulations on specific absorption rate (SAR). The antenna described herein includes a vent and a slot that is excited via a feed PCB. In an embodiment, the vent may include one or more of an audio vent or a thermal vent. In these embodiments, an excitation current is passed around an inner circumference of the vent such that a specific RF may be emitted by the antenna. In order to support a specific RF, the length of the circumference of the vent may be altered to fit a specific RF frequency. Alternatively, or additionally, a position along the circumference of the vent may be selected and grounded such that the length of the antenna is determined by the position selected. Additionally, or alternatively, a coupled capacitance may be created such that a distributed self-capacitance is formed between the ends of the slot along a vent edge to help reduce, for example, the 2.4 GHz length and self-matching. In an embodiment, the antenna of the information handling systems 210, 220, and 230 may include an inverted-F antenna (IFA) design by using a feed PCB that is offset from the slot formed in the bottom metal chassis and with the vent edge. In this embodiment, a pogo pin and the feed PCB can be used to excite the circumference of the vent as described in embodiments herein.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3A:
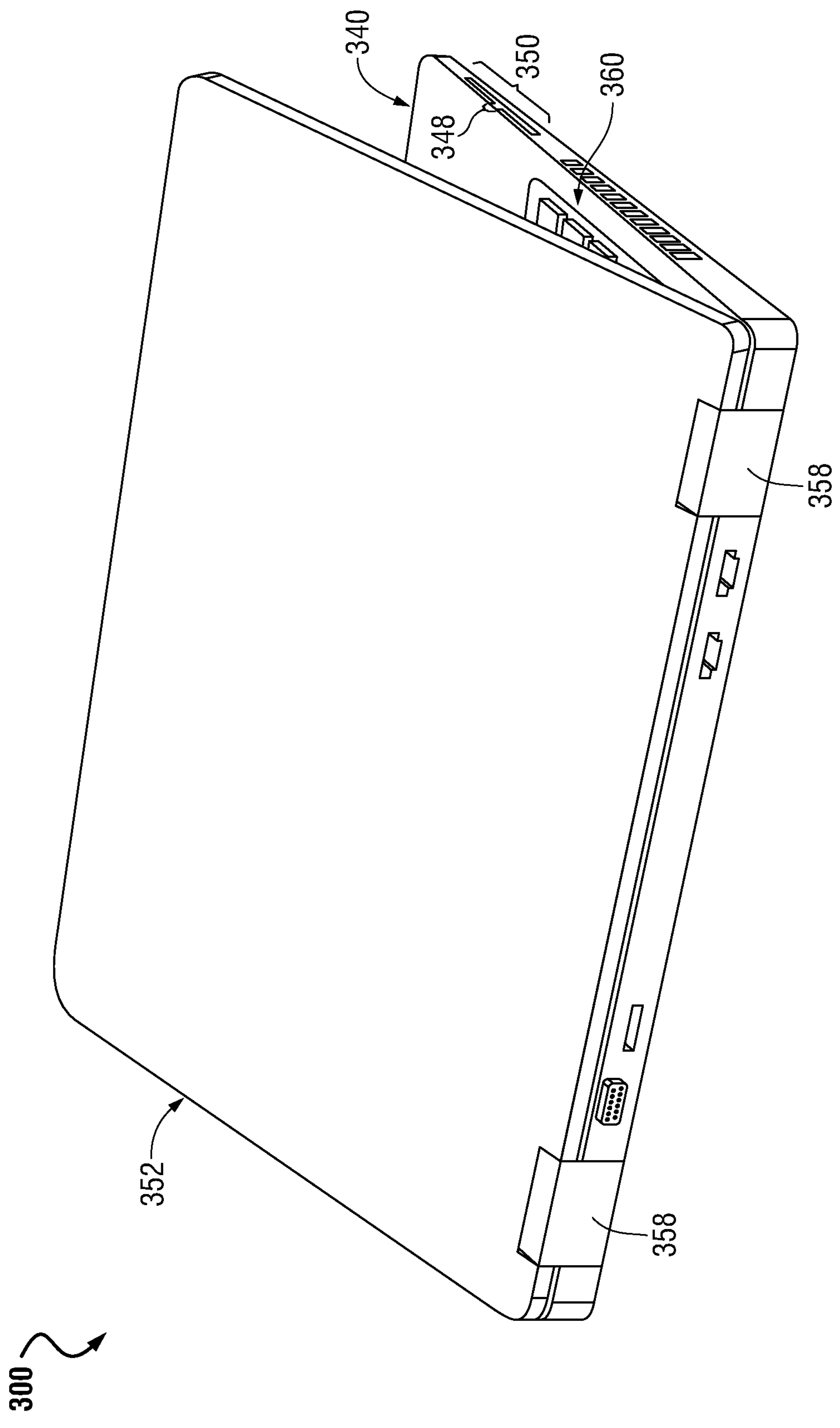
FIG. 3A is a graphical illustration perspective view of an information handling system having a plurality of metal chassis placed in a semi-closed configuration according to an embodiment of the present disclosure.

FIG. 3A is a graphical illustration perspective view of an information handling system 300 having a metal chassis placed in a semi-closed configuration according to an embodiment of the present disclosure. The graphical illustration of FIG. 3A is a perspective view of the back of an information handling system 300 showing the base chassis and the lid chassis, also referred to as a display chassis. The semi-closed configuration is shown for illustration purposes. It is understood that a closed configuration would have the display housing 352 fully closed onto the base housing 340. As described, the information handling system 300 in an embodiment may comprise an outer metal case or shell of an information handling system such as a tablet device, laptop, or other mobile information handling system. As shown in FIG. 3A, information handling system 300, in an embodiment, may further include a plurality of chassis or cases. For example, the information handling system 300 may include the A-cover (e.g. a back chassis of the display housing 352) functioning to enclose a portion of the information handling system 300. As another example, the information handling system 300, in an embodiment, may further include a D-cover (e.g., a bottom chassis of the base housing 340) functioning to enclose another portion of the information handling system along with a C-cover (e.g. a top chassis of the base housing 340). In an embodiment, the D-cover includes a vent 350 and a slot 348 which function as a transmitting/receiving antenna according to the embodiments described herein. The C-cover may include, for example, a keyboard 360, a trackpad, or other input/output (I/O) device. As shown in FIG. 3A, when placed in the semi-closed configuration, the A-cover forms a top outer protective shell, or a portion of a lid for the information handling system, while the D-cover forms a bottom outer protective shell, or a portion of a base. As also can be seen in FIG. 3A, when in the fully closed configuration, the A-cover and the D-cover would be substantially parallel to one another.

In some embodiments, both the A-cover and the D-cover may be comprised entirely of metal. In some embodiments, the A-cover and D-cover may include both metallic and plastic components. For example, plastic components that are radio-frequency (RF) transparent may be used to form a portion of the D-cover where a slot 348 at the vent 350 is located. According to some embodiments of the present disclosure, the slot 348 may include such a plastic piece that is placed therein using a nano-molding technology (NMT) process. Because the vent 350 serves a dual purpose as operating as the antenna described herein as well as either of an audio vent or a thermal vent, the vent 350 itself may be left open without a plastic formed therein.

In the embodiment show in FIG. 3A, the D-cover includes is a vent 350 shown to be formed and located along a side edge of the D-cover. As described in more detail herein, the vent 350 and its slot 348 may be formed on a left side, a right side, or a back side of the information handling system 300 such that the vent 350 is co-located with one or both of an audio vent and a thermal vent depending on where the audio vent and thermal vent is formed on the D-cover. These different placements of the vent 350 relative to, for example, a speaker of a thermal control system within the base housing 340 will be described herein.

In an embodiment, the A-cover may be movably connected to a back edge of the D-cover via one or more hinges 358. In any embodiment, the hinges 358 may allow the A-cover/B-cover (not visible) assembly of the display housing 352 to move relative to the C-cover/D-cover assembly of the base housing 340 to allow for the orientations described herein.

Figure 3B:
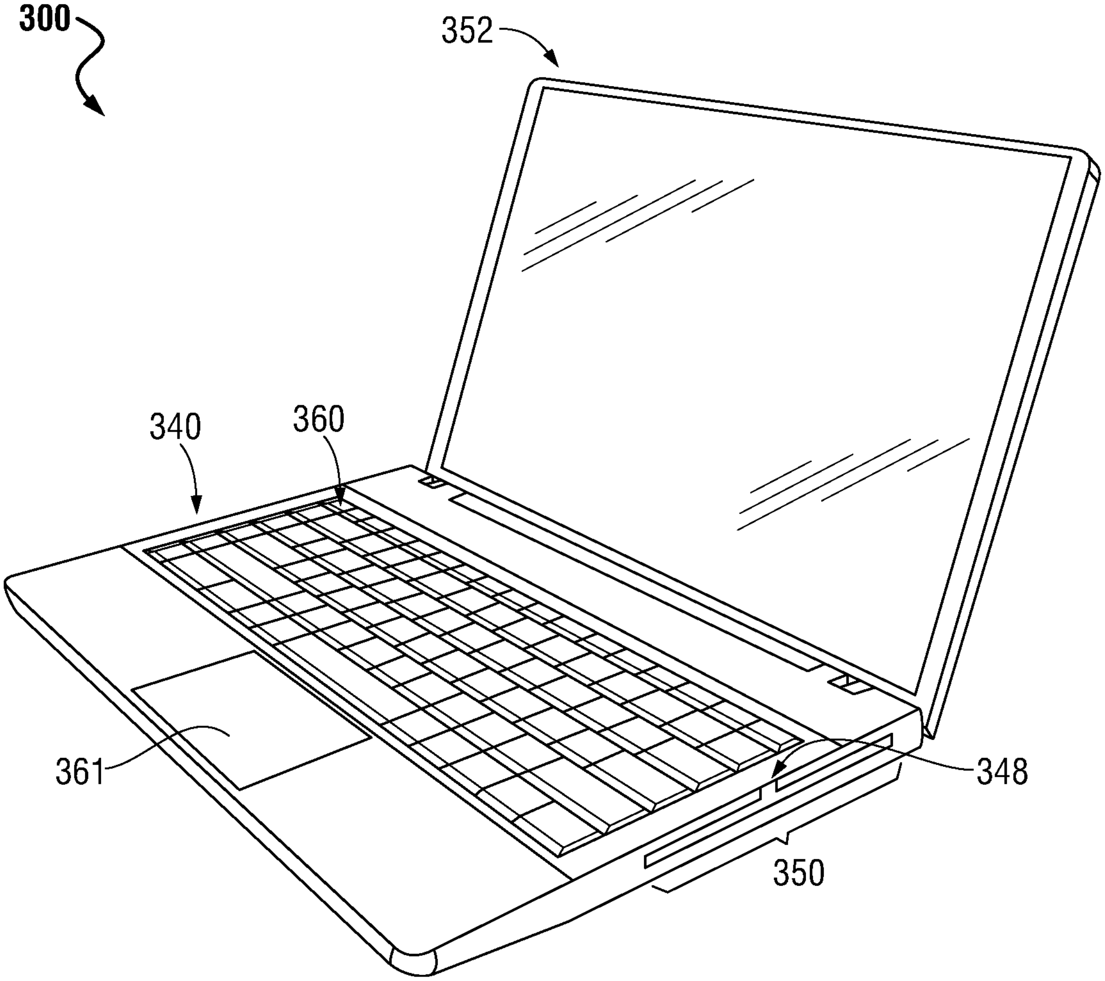
FIG. 3B is a graphical illustration perspective view of an information handling system having a plurality of metal chassis placed in an open configuration according to an embodiment of the present disclosure.

FIG. 3B is a graphical illustration perspective view of an information handling system having a plurality of metal chassis placed in an open configuration according to an embodiment of the present disclosure. The graphical illustration of FIG. 3B is a perspective view of the front of an information handling system 300 showing the base housing 340 and the display housing 352. The information handling system 300, in an embodiment, may comprise an outer metal case or shell of an information handling system 300 for housing internal components of the information handling system 300, such as a video display, a cursor control device, and an alpha numeric input device. As shown in FIG. 3B, the information handling system 300 may include a B-cover functioning to enclose the video or digital display device with the A-cover described herein. As another example, the information handling system 300 may further include the C-cover functioning to enclose a cursor control device and/or a keyboard 112 acting as an alpha numeric input device. The A-cover (not visible) and the B-cover may be joined together in an embodiment to form a fully enclosed lid chassis, while the C-cover and the D-cover may be joined together to form a fully enclosed base housing 340. Taking the closed configuration as a reference position of the lid chassis including the A-cover and the B-cover and the base housing 340 including the C-cover and the D-cover, the display housing 352 including the A-cover and the B-cover may be rotated away from the base housing 340 including the C-cover and the D-cover to an open configuration. For example, as shown in FIG. 3B, when placed in the open configuration, the display housing 352 including the A-cover and the B-cover may be rotated away from the C-cover and placed at an angle less than 180 degrees from the base housing 340 including the C-cover and the D-cover, such that a user may view the video/graphics display device as part of the B-cover and interact with the cursor control device 361 (e.g., a touch pad or track pad) and/or keyboard 360 within the C-cover.

As described herein, the vent 350 may be formed on any surface of the D-cover such as a left side, a right side, and a back side of the D-cover. In an aspect, the D-cover may have curved sides that slope to the bottom of the D-cover and location may be on a left side, right side, or back side or may be on a sloping portion along those sides in various embodiments. In FIG. 3B, the vent 350 is shown to be formed on a left side of the D-cover and co-located with one or both of the audio vent and thermal vent. Although these figures show that the vent 350 is co-located with either of an audio vent or thermal vent, the present disclosure contemplates that the vent 350 is co-located with the audio vent alone, co-located with the thermal vent alone, or arranged among both the audio vent and thermal vents in the information handling system 300. In any embodiment presented herein, it is understood that the vent 350 may be co-located with one of the audio vent or thermal vent while one of the audio vent and thermal vent is formed on a second side of the D-cover. In the present specification it is understood that the co-location of the antenna with any vent 350 means that the vent 350 with its slot 348 is used as antenna as a feed PCB excites an inner circumference of the vent 350.

As described herein, the slot 348 may be formed by cutting into the D-cover from a top portion of the vent 350 to a terminal edge of the D-cover. This terminal edge of the D-cover may be a surface of the D-cover that contacts the bottom of the C-cover. In these embodiments, the slot 348 may be filled with a plastic using a NMT process. Because plastic is RF transparent, the antenna created by the excitation of the vent 350 may not be inhibited from transmitting and receiving data from a network. Additionally, because the vent 350 may be an audio vent or a thermal vent, sound or heat, respectively, may be allowed to pass out of the vent 350 thereby allowing the vent 350 to be used for a dual purpose.

Figure 3C:
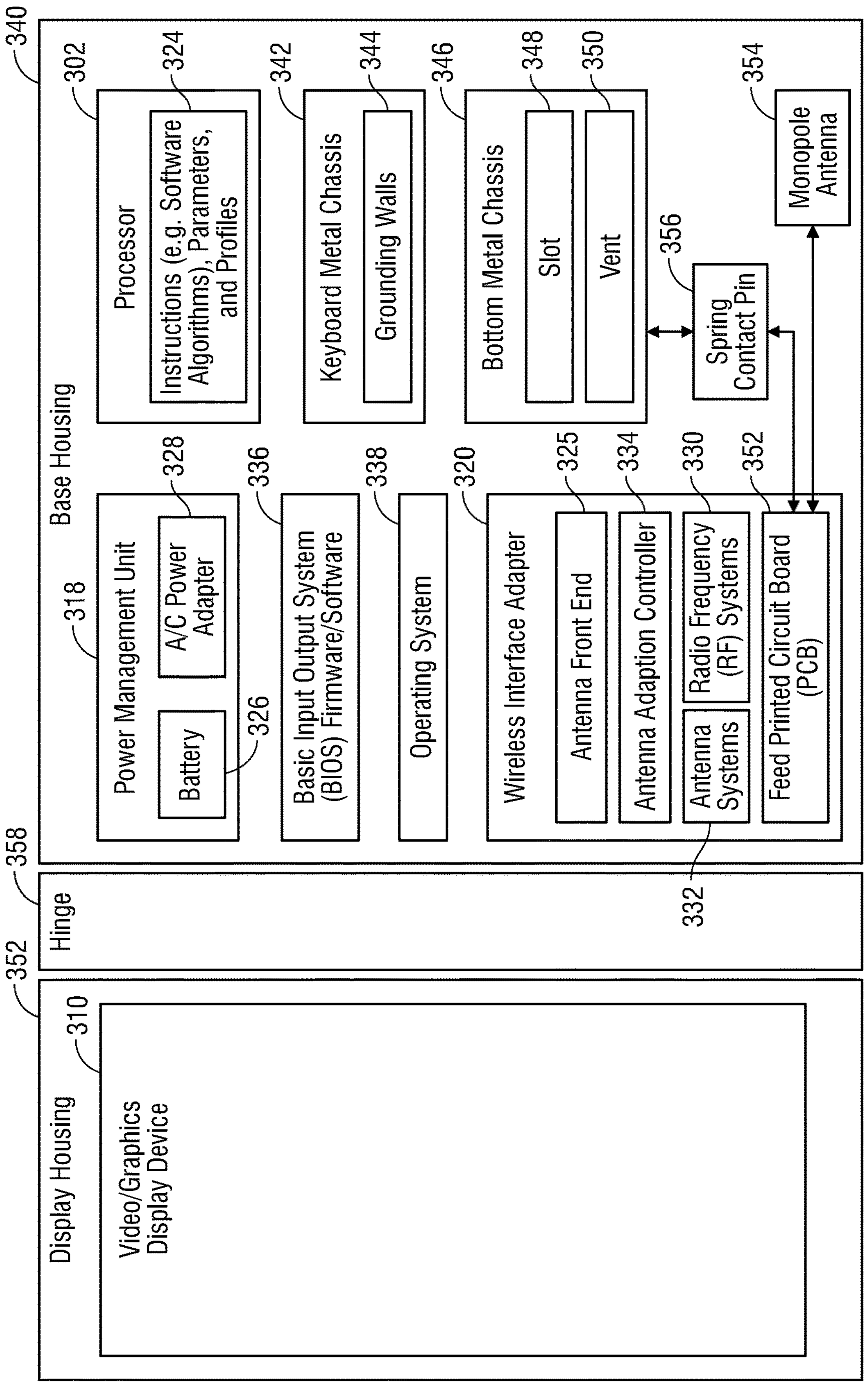
FIG. 3C is a block diagram of an embodiment of information handling system according to an embodiment of the present disclosure.

FIG. 3C is a block diagram of an embodiment of information handling system 300 according to an embodiment of the present disclosure. In this embodiment shown in FIG. 3C, the information handling system 300 includes a display housing 352 operatively coupled to a base housing 340 via a hinge 358. In this embodiment, the information handling system 300 may be a laptop-type information handling system 300 that may be oriented in certain configurations such as a laptop configuration, an easel configuration, a tablet configuration, a reverse easel orientation, among others. In an embodiment, the display housing 352 may be removed from the base housing 340 at the hinge 358 such that the video/graphics display device 310 or base housing 340 may be reversed and recoupled to each other.

The display housing 352 may include a video/graphics display device 310 that may serve as a B-cover as described herein. The display housing 352 may include additional hardware devices such as a camera, a microphone, or other output/input devices. In an embodiment, a power line and bus may be routed from the display housing 352 to the base housing 340 so that these hardware devices may receive power and transmit and receive data to and from the processor 302.

The base housing 340 may include those devices described in connection with FIG. 1. For example, the base housing 340 may include a processor 302, any instructions, parameters, and profiles 324 executed by the processor 302, and a PMU 318 that includes a battery 326 and A/C power adapter 328 as described herein. During operation, the processor 302 or any other controller may execute a BIOS 336 during start-up which then boots an operating system 338 in order to provide the user with the ability to interact with the information handling system 300 by providing input and receiving output.

As described herein, the information handling system 300 operating as a mobile information handling system may include an antenna located within the base housing 340 (e.g., the keyboard metal chassis and bottom metal chassis) and formed out of a vent 350 and slot 348 into the bottom metal chassis 346 (aka: D-cover). Although a specific embodiment is described herein describes the antenna being formed at a vent formed in the bottom metal chassis 346, the present specification contemplates that the antenna may be formed at any vent formed along any surface of any chassis of the information handling system 300. In the embodiment, shown in FIG. 3C, the vent 350 may be a thermal vent with the slot 348 passing between the thermal vent and a terminal upper edge of the bottom metal chassis 346. In another embodiment, the vent 350 may be an audio vent with the slot 348, again, passing between the audio vent and a terminal upper edge of the bottom metal chassis 346. In both embodiments, a base housing 340 may be formed by placing the keyboard metal chassis 342 (aka: C-cover) over the bottom metal chassis 346. Within the base housing 340, a feed printed circuit board (PCB) 352 may be operatively coupled to the bottom metal chassis 346 via a spring contact pin 356. By operatively coupling the feed PCB 352 to the bottom metal chassis 346 and the vent 350 and slot 348 formed therein, the vent 350 and slot 348 may operate as an antenna by allowing antenna surface currents to travel around a circumference of the vent 350 with the slot 348. This builds a distributed capacitance that helps to tune and match the antenna tuning without the need for discrete lumped elements being soldered onto the structure of the base housing 340 or bottom metal chassis 346 driving the costs associated with, for example, forming surface mounted technology (SMT) parts on the bottom metal chassis 346.

By partitioning the bottom metal chassis 346 this way, the antenna may be better concealed within the bottom metal chassis 346 increasing the design aesthetics of the information handling system 300. Also, by placing the antenna along the edge of the bottom metal chassis 346, for example, may eliminate any RF interference from other components of the information handling system 300 and provide any additional bandwidth to support, for example, 6 GHz WiFi, while enabling a seamless design of the base housing 340 and display housing with an all-metal or nearly all-metal A-cover, four-sided narrow bezel at the video/graphics display device 310, and an edge-to-edge keyboard, for example.

In an embodiment, the feed PCB 352 may be operatively coupled to a monopole antenna 354 formed on a speaker box or other portion of the information handling system 300. In an embodiment, the monopole antenna 354. In an embodiment, the monopole antenna 354 may also increase the RFs emitted by the information handling system 300 apart from those RFs emitted by the excitation of the vent 350 and slot 348 as described herein. The monopole antenna 354 may be grounded to one of any number of grounding walls 344 formed in, for example, the keyboard metal chassis 342. In this embodiment, the monopole antenna 354 may be of any length in order to cause a specific EM RF signal to be emitted. In an embodiment, the slot 348 and vent 350 operating as an aperture antenna along with the monopole antenna 354 may individually be selected to be operated by the feed PCB 352 via any type of other antenna systems 332.

As described herein, network interface device shown as wireless adapter 320 can provide connectivity to a network 328, e.g., a wide area network (WAN), a local area network (LAN), wireless local area network (WLAN), a wireless personal area network (WPAN), a wireless wide area network (WWAN), or other types of networks. Connectivity may be via wired or wireless connection. Wireless adapter 320 may include one or more RF systems 330 with transmitter/receiver circuitry, modem circuitry, one or more antenna front end circuits 325, one or more wireless controller circuits such as antenna adaptation controller 334, amplifiers, antenna systems 332 and other RF subsystem circuitry 330 for wireless communications via multiple radio access technologies. Each RF subsystem 330 may communicate with one or more wireless technology protocols. The RF subsystem 330 may contain individual subscriber identity module (SIM) profiles for each technology service provider and their available protocols for subscriber-based radio access technologies such as cellular LTE communications. The wireless adapter 320 may also include antenna systems 332 which may be tunable antenna systems or may include an antenna adaptation network for use with the system and methods disclosed herein to optimize antenna system operation. Additional antenna system adaptation network circuitry (not shown) may also be included with the wireless interface adapter 320 to implement WLAN or WWAN modification measures.

Figure 4:
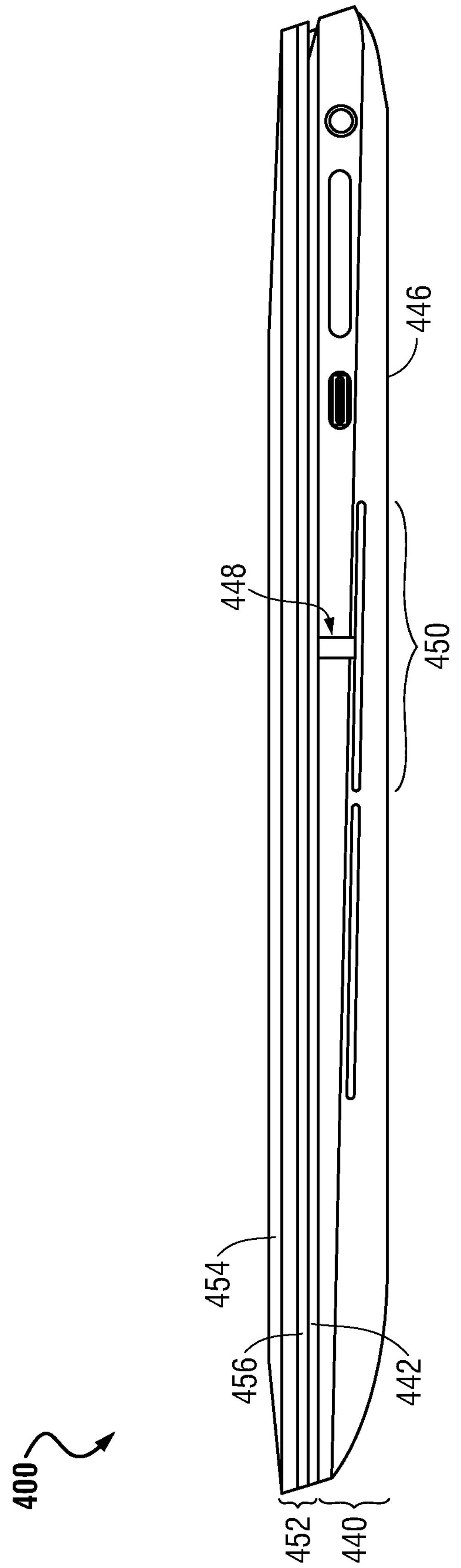
FIG. 4 is a graphical illustration side view of an information handling system having a plurality of metal chassis placed in a closed configuration according to an embodiment of the present disclosure.

FIG. 4 is a graphical illustration side view of an information handling system having display chassis 452 and base chassis 440 a plurality of metal chassis placed in a closed configuration according to an embodiment of the present disclosure. As described herein, the base housing 440 may include a C-cover 442 and D-cover 446 while the display housing 452 is composed of an A-cover 454 and a B-cover 456. In order to increase the aesthetics, strength, and performance of the information handling system 400, the A-cover 454 and D-cover 446 may be made of a metal such as aluminum, magnesium aluminide (MgAl) or any other type of metal that would provide good strength and aesthetics to the assembled information handling system 400. In FIG. 4 the information handling system 400 is shown in a closed orientation such that the A-cover 454 and D-cover 446 are parallel with each other and the C-cover 442 and B-cover 456 are facing one another.

As described herein, the antenna may be located within the base housing 440 (e.g., D-cover 446) and formed out of the vent 450 and slot 448 into the metal base housing 440. The vent 450 may be, in an embodiment, a thermal vent with the slot 448 passing between the thermal vent and a terminal upper edge of the D-cover 446. In another embodiment, the vent 450 may be an audio vent with the slot 448, again, passing between the audio vent and a terminal upper edge of the D-cover 446. In both embodiments, a base housing 440 may be formed by placing a keyboard metal chassis (e.g., C-cover 442) over a bottom metal chassis (e.g., D-cover 446). Within the base housing 440, a feed printed circuit board (PCB) may be operatively coupled to the D-cover 446 via a spring contact pin. By operatively coupling the feed PCB to the D-cover 446 and the vent 450 and slot 448 formed therein, the vent 450 and slot 448 may operate as an antenna by allowing antenna surface currents to travel around an inner circumference of the vent 450 with the slot 448. This builds a distributed capacitance that helps to tune and match the antenna tuning without the need for discrete lumped elements being soldered onto the structure of the base housing 440 or D-cover 446 driving the costs associated with, for example, forming surface mounted technology (SMT) parts on the D-cover 446. By partitioning the D-cover 446 this way, the antenna may be better concealed within the D-cover 446 increasing the design aesthetics of the information handling system 400. Also, by placing the antenna along the edge of the D-cover 446 as shown in FIG. 4, this may eliminate any RF interference from other components of the information handling system 400 and provide any additional bandwidth to support, for example, 6 GHz WiFi, while enabling a seamless design of the base housing 440 and display housing 452. For example, base housing 440 and display housing 452 may include an all metal A-cover 454, four-sided narrow bezel at the video/graphics display device (e.g., B-cover 456), and an edge to edge keyboard, in some embodiments.

In an embodiment, the spring contact pin may also operatively couple the feed PCB to a parasitic coupling element. In an embodiment, the parasitic coupling element may change the directionality or pattern of the radiated RF signals from the antenna. In an embodiment, the parasitic coupling element may also change the RF emitted by the antenna formed by the excitation of the vent 450 and slot 448. In an embodiment, the parasitic coupling element may direct the radiated RF signals up and away from a top surface of the C-cover 442 as well as out from the side of the D-cover 446 where the vent 450 and slot 448 are located. The parasitic coupling element may be grounded to one of any number of grounding walls formed in, for example, the C-cover 442 or D-cover 446. In an embodiment, the parasitic coupling element may be used to actively steer the EM RF signals out of the vent 450 as well as create a second or additional RF EM bands to be emitted by the antenna system described herein. In this embodiment, the parasitic coupling element may be an inert element that is not activated by an electrical source in order to cause the steering of the EM RF signal or the creation of the second or additional RF EM band. In one embodiment, the parasitic coupling element may be operatively coupled to a variable impedance termination. In this embodiment, using a parasitic coupling element with a variable impedance termination may be triggered by a switch or digitally via the feed PCB, the information handling system 400 may control the directionality of the transmission signal to thereby cause a shift of transmission pattern. An antenna adaptation controller may control this aperture tuning for the antenna ports for the antenna to alter RF transmission pattern potentially improve RSSI, SNR, MCS or other performance factors.

As described herein, the D-cover 446 may include a vent 450 formed into a surface of the metal. In the example shown in FIG. 4, the vent 450 is formed in a right sidewall of the D-cover 446. Because this sidewall of the D-cover 446 slopes inward under the information handling system 400 an opening of the vent 450 may be directed slightly downwards in an embodiment. However, this may not affect the directionality of the EM RF signals out of the vent 450 as described herein.

According to some embodiments of the present disclosure, the slot 448 may include a plastic piece that is placed therein using a nano-molding technology (NMT) process. Because the vent 450 serves a dual purpose as operating as the antenna described herein as well as either of an audio vent or a thermal vent, the vent 450 itself may be left open without a plastic formed therein.

Embodiments of the present disclosure may decrease the complexity and cost of creating chasses for information handling systems by forming the outer chassis (e.g., the D-cover) entirely of metal and co-locating an antenna with a vent formed therein. In an embodiment, this vent may be an audio vent and/or a thermal vent that is used to transmit audio waves from a speaker or dissipate heat out of the information handling system, respectively. This placement of the antenna at a location along with either the audio vent or thermal vent allows the antenna to be placed at a location that provides for a relatively more streamlined information handling system as described herein. Additionally, regardless of the orientation of the information handling system, the antenna receipt and transmission strength may remain constant. Still further, the vent (e.g., audio vent or thermal vent) includes a slot formed between the vent and a terminal edge of the bottom metal chassis (e.g., the D-cover) so that the antenna uses the metal of the bottom metal chassis of create radiating RF bands along inner edges of the vent. This allows the vent to be used for a dual purpose thereby placing multiple components of the information handling system at a single location and providing additional space within the information handling system for other potential components.

Figure 5:
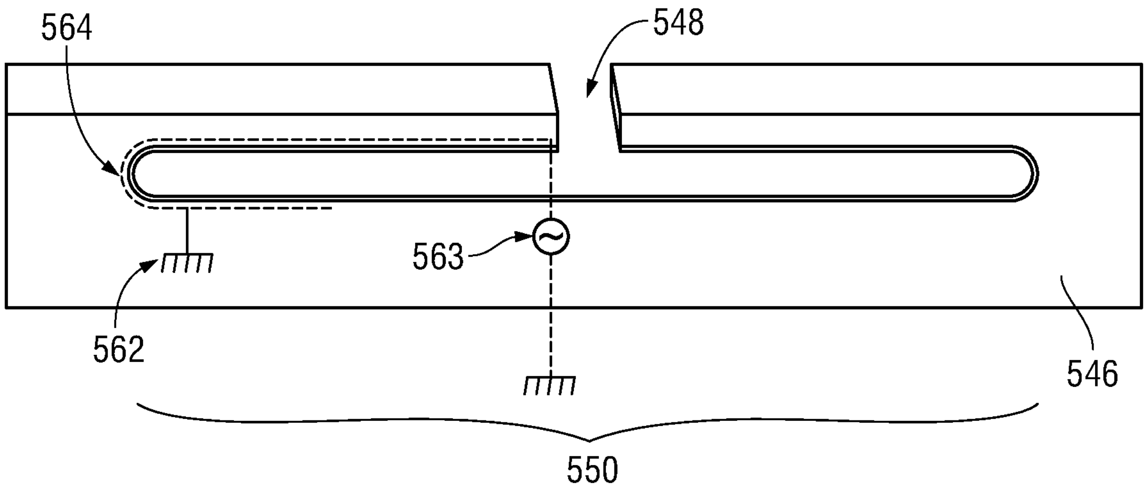
FIG. 5 is a graphical illustration side view of a vent and slot formed in the bottom metal chassis to facilitate the transmission of a radio frequency (RF) signal according to an embodiment of the present disclosure.

FIG. 5 is a graphical illustration side view of a vent 550 and slot 548 formed in a metal chassis to facilitate the transmission of a radio frequency (RF) signal according to an embodiment of the present disclosure. This close-up view of the vent 550 and slot 548 shows a circuit diagram 564 overlayed on top of the image of the slot 548. It is understood that the dimensions of the vent 550 and slot 548 may be changed in order to achieve specific RF transmission and reception at the antenna as well as different distributed capacitances formed between the edges of the slot 548 to help reduce the 2.4 GHz antenna length and increase the ability to impedance match with and RF circuitry output impedance ($Z_o$). For example, location of the slot 548 along the vent 550, or the vent length or gap width may be altered to accommodate specific transmission and reception in particular frequency bands.

As described herein, the slot 548 and vent 550 may be formed in a bottom metal chassis 546 (e.g., a D-cover) of the information handling system in an embodiment. This bottom metal chassis 546 may be made of any type of metal including aluminum, MgAl, or similar metals or alloys of metals such that the aesthetics of the information handling system is increased. According to the embodiments of the present specification, the vent 550 may be an audio vent or thermal vent used by the information handling system to emit sounds or pass heated air out of, respectively, from the interior of the information handling system. Accordingly, in an embodiment, a speaker may be placed behind the vent 550 so that sound may be emitted therefrom and passed out of the audio vent 550. In an alternative embodiment, a fan, cooling tubes, or other thermal control cooling mechanisms may be placed behind the thermal vent 550 so that hot air may be dissipated out of the information handling system.

The circuit diagram 564 overlayed on top of the image of the vent 550 describes a potential length of an antenna formed along an inner circumference of the vent 550 formed in the bottom metal chassis 546. By placing the slot 548 at a specific location along the side wall of the bottom metal chassis 546 and above the vent 550, the side wall is broken allowing for the creation of an antenna surface currents along the interior circumference of the vent 550 and slot 548. This may form a relatively longer band partition on one side of the slot 548 that radiates at a low frequency while a shorter band partition is formed on the opposite side of the slot 548 that radiates at a relatively higher frequency. In an embodiment, the length of either of these band partitions may be determined by the placement of a ground 562 structure at a certain point across the section of the vent 550 without closing or filling the vent 550. This arrangement of the ground 562 structures may provide a flexibility in design in order to alter the radiation modes and tune the antenna formed at the vent 550. Further, the formation of the slot 548 between the two side bands may build a distributed capacitance that helps tune and match the antenna tuning.

In an embodiment, the vent 550 is excited using a feed PCB (not shown) that is operatively coupled to a processor or an antenna adaption controller. The excitation source 563 from the feed PCB may create a specific RF to resonate at the slot 448 and vent 550 such as shown at a in the circuit diagram 564. In FIG. 5, the overall length of the slot 548 may be 45 mm such that a 2.4 GHz RF may resonate from the vent 550 (45 mm being ½ wavelength for a 2.4 GHz RF). In this embodiment, the slot 548 may be 3 mm wide allowing for the appropriate distributed capacitance used to tune and match the antenna tuning.

In order to prevent any inductive and capacitance coupling between the vent 550 and slot 548 acting as the antenna and any other operating device within the information handling system, the portion of the bottom metal chassis 546 where the vent 550 and slot 548 are formed may be grounded. For example, a portion of the C-cover (e.g., keyboard metal chassis) may include a number of grounding walls that, when the C-cover is installed, protect the operation of the antenna from those inductive and/or capacitive coupling effects from the remaining hardware in the information handling system in some embodiments. According to the embodiments described herein, the grounding structures used for ground 562 may be discrete points along the edge circumference of the vent 550 or section along the vent 550 that provide a ground to the aperture antenna formed by the vent 550 and slot 548. In an embodiment, a grounding structure used as ground 562 may include a metal strut electrically coupled across the vent 550. In an embodiment, a grounding structure used as ground 562 may include a grounding wall (e.g., ground walls 344 in FIG. 3C, grounding walls 744 in FIG. 7, grounding walls 844 in FIGS. 8A-8E).

Figure 6:
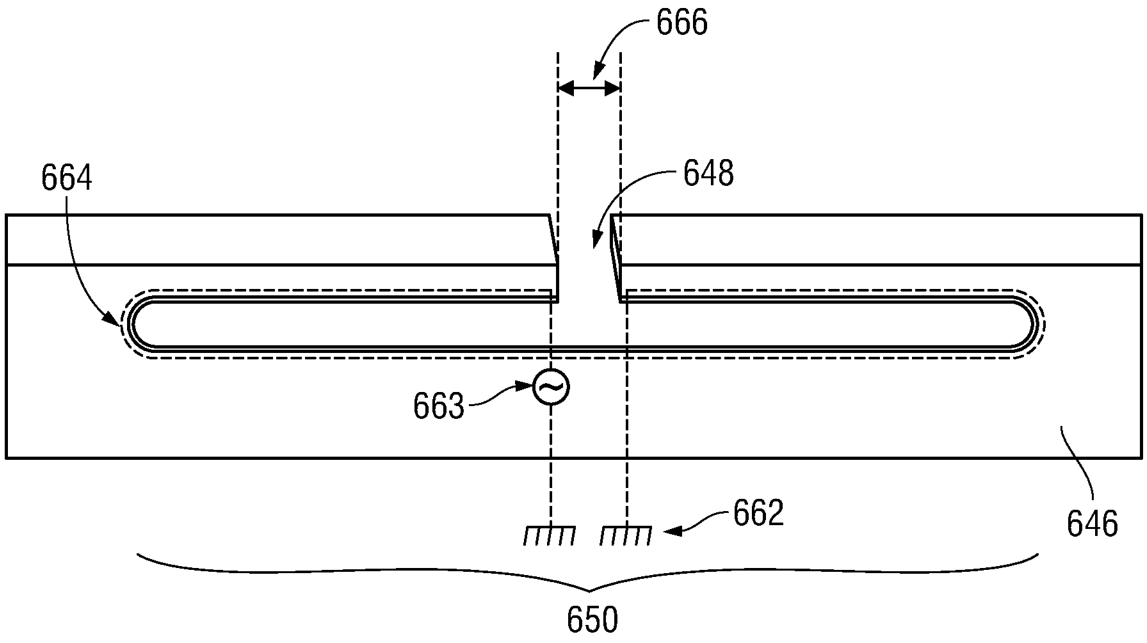
FIG. 6 is a graphical illustration side view of a vent and slot formed in the bottom metal chassis to facilitate the transmission of a radio frequency (RF) signal according to another embodiment of the present disclosure.

FIG. 6 is a graphical illustration side view of a vent 650 and slot 648 formed in the bottom metal chassis 646 to facilitate the transmission of a radio frequency (RF) signal from an antenna placed behind the vent according to another embodiment of the present disclosure. This close-up view of the vent 650 and slot 648 also shows a circuit diagram 664 overlayed on top of the image of the slot 648 and vent 650. It is understood that the dimensions of the vent 650 and slot 648 may be changed in order to achieve specific RF transmission and reception at the antenna as well as different distributed capacitance formed between the edges of the slot 648 to help reduce the 2.4 GHz antenna length and increase the ability to impedance match with and RF circuitry output impedance ($Z_o$). In an embodiment, the overall length of the slot 648 may be 45 mm such that a 2.4 GHz RF may resonate from the vent 650 (45 mm being ½ wavelength for a 2.4 GHz RF). In this embodiment, the slot 648 may be 3 mm wide allowing for the appropriate distributed capacitance used to tune and match the antenna tuning. The vent 650 would have a length shorter than the length of, for example, vent 550 in FIG. 5 in this example embodiment.

As described herein, the slot 648 and vent 650 may be formed in a bottom metal chassis 646 (e.g., a D-cover) of the information handling system. This bottom metal chassis 646 may be made of any type of metal including aluminum, MgAl, or the like such that the aesthetics of the information handling system is increased. According to the embodiments of the present specification, the vent 650 may be an audio vent or thermal vent used by the information handling system to emit sounds or pass heated air out of, respectively, from the interior of the information handling system. Accordingly, in an embodiment, a speaker may be placed behind the vent 650 so that sound may be emitted therefrom and passed out of the audio vent 650. In an alternative embodiment, a fan, cooling tubes, or other cooling mechanisms may be placed behind the thermal vent 650 so that hot air may be dissipated out of the information handling system.

The circuit diagram 664 overlayed on top of the image of the vent 650 describes a potential length of an antenna formed along an inner circumference of the vent 650 formed in the bottom metal chassis 646. By placing the slot 648 at a specific location along the side wall of the bottom metal chassis 646 and above the vent 650, the side wall is broken allowing for the creation of an antenna surface current along the interior circumference of the vent 650 and slot 648. Unlike FIG. 5, the antenna formed at the vent 650 in FIG. 6 is accomplished by placing a grounding source closer to a terminal end of the inner circumference of the vent 650. Again, the ground 662 structure is placed at a certain point across the section of the vent 650 without closing or filling the vent 650. This arrangement of the ground 662 structures may provide a flexibility in design in order to alter the radiation modes and tune the antenna formed at the vent 550. In this embodiment, the design of this antenna may be a loop antenna structure with the ends of the vent 650 at the slot 648 being used to make a specific capacitance at the slot 648. Based on the distance 666 between these ends of the vent 650 at the slot 648, a specific frequency mode may be resonated by this capacitance with a specific inductance resulting from the length of the inner circumference of the vent 650 (e.g., the length of the antenna).

In an embodiment, the vent 650 is excited using a feed PCB that is operatively coupled to a processor or an antenna adaption controller. The excitation from the feed PCB may create a specific RF to resonate at the slot 648 and vent 650 such as shown at 663 in circuit diagram 664. Again, in order to prevent any inductive and capacitance coupling between the vent 650 and slot 648 acting as the antenna and any other operating device within the information handling system, the portion of the bottom metal chassis 646 where the vent 650 and slot 648 are formed may be grounded. For example, a portion of the C-cover (e.g., keyboard metal chassis) may include a number of grounding walls that, when the C-cover is installed, protect the operation of the antenna from those inductive and/or capacitive coupling effects from the remaining hardware in the information handling system in some embodiments. According to the embodiments described herein, the grounding structures used for ground 662 may be discrete points along the edge circumference of the vent 650 or section along the vent 650 that provide a ground to the aperture antenna formed by the vent 650 and slot 648. In an embodiment, a grounding structure used as ground 662 may include a metal strut electrically coupled across the vent 650. In an embodiment, a grounding structure used as ground 662 may include a grounding wall (e.g., ground walls 344 in FIG. 3C, grounding walls 744 in FIG. 7, grounding walls 844 in FIGS. 8A-8E).

Figure 7:
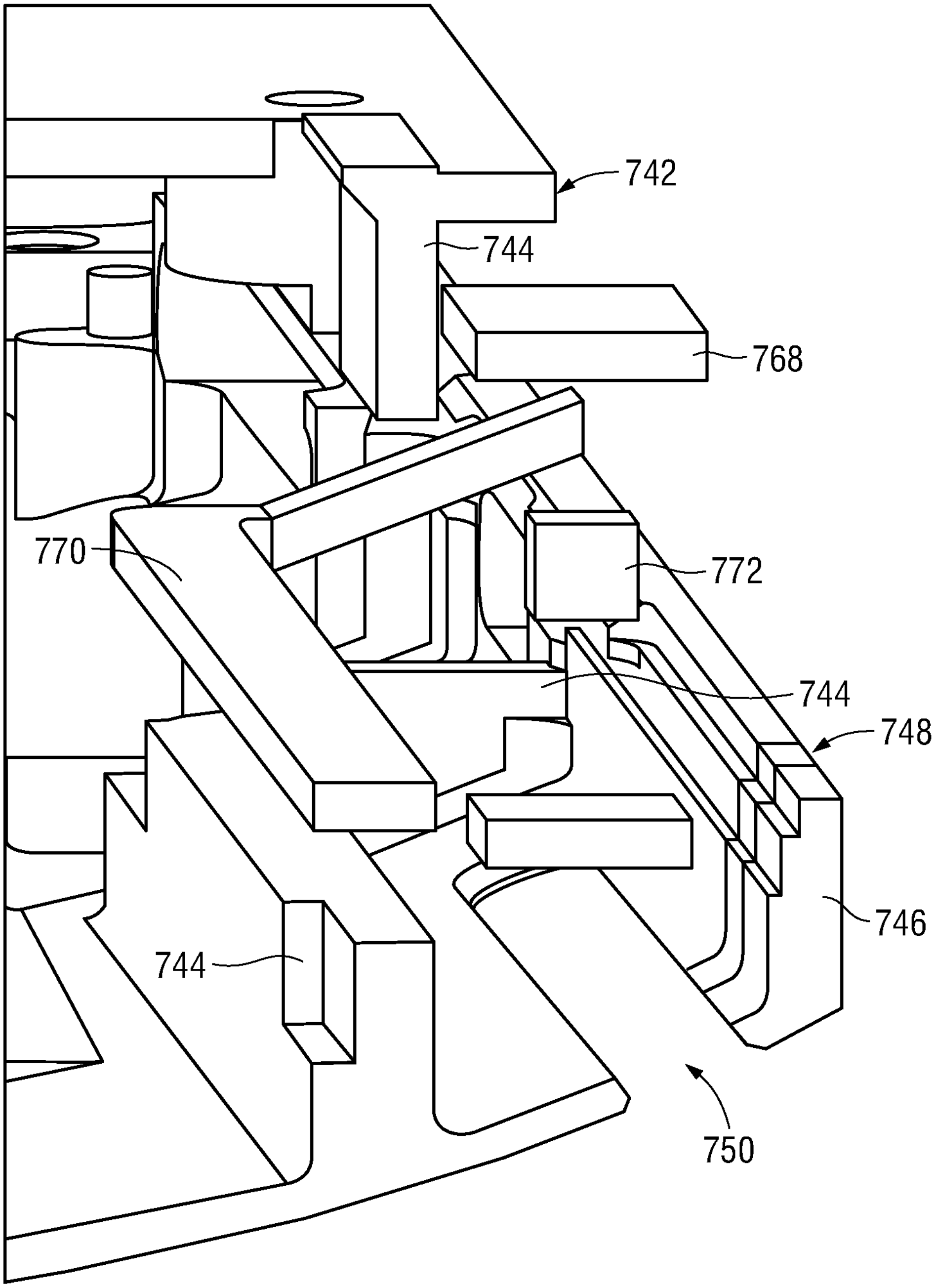
FIG. 7 is a graphical illustration cross cut, exploded, perspective view of a vent and a slot formed internal to the bottom metal chassis used as an antenna according to an embodiment of the present disclosure.

FIG. 7 is a graphical illustration crosscut, exploded, perspective view of a vent 750 and a slot 748 formed internal to the bottom metal chassis 746 used as an antenna according to an embodiment of the present disclosure. In the embodiment shown in FIG. 7, the vent 750 is formed into the bottom metal chassis 746 to allow hot air from any thermal dissipation device within the information handling system to be expelled from the interior portions of the information handling system. Although the vent 750 is described as a thermal vent dual purposed as an antenna according to the embodiments in FIG. 7, the present specification contemplates that the vent 750 may also be used as a speaker vent used to emit sound out of the vent 750 as output to a user.

The vent 750 and slot 748, in an embodiment, may be cut into a side or bottom of the bottom metal chassis 746 as shown. The vent 750, in this embodiment, may be angled slightly downward due to the slight slope of the sidewall of the bottom metal chassis 746 as shown. However, the orientation and arrangement of the vent 750 and slot 748 may be different based on the form factor of the bottom metal chassis 746.

In an embodiment, the slot 748 may be filled with an RF transparent material. This RF transparent material may include a plastic that is installed into the slot 748 using a NMT process. The vent 750, in these embodiments, however, is left open and the plastic filling the slot 748 may end where the slot 748 meets the vent 750. As shown in FIG. 7, the plastic is also placed into the slot 748 up until a terminal edge of the wall of the bottom metal chassis 746.

In order to prevent any electromagnetic interferences (inductance or capacitance) from interfering with the operation of the antenna at the vent 750 and slot 748, the bottom metal chassis 746 as well as a keyboard metal chassis 742 may include a number of grounding walls 744 and a conductive gasket 770. The grounding walls 744 may be formed into the body of the bottom metal chassis 746, the body of the keyboard metal chassis 742, or both such that the mating of the bottom (or D-cover) metal chassis 746 and keyboard (or A-cover) metal chassis 742 operatively seals the vent 750 and slot 748 used as the antenna from the interferences that may be experienced due to the activation of the other hardware devices in the information handling system such as the processor, a hard drive, a keyboard, and the like. The grounding walls 744 may sandwich the conductive gasket 770 between them such that any errant inductive or capacitive sources may be grounded away from the vent 750 and slot 748. The conductive gasket 770 may be made of any compressible conductive material that can redirect these errant inductive or capacitive emissions into the body of the bottom metal chassis 746 or keyboard metal chassis 742 so as to not affect the operation of the antenna. In an embodiment, the conductive gasket 770 may further ground any inductive or capacitive emissions originating from a cooling system or speaker placed behind the vent 750 as described herein.

In order to provide an excitation signal to the vent 750 and slot 748, the bottom metal chassis 746 may have a feed PCB 768 placed therein. The feed PCB 768 may be operatively coupled to a wireless interface adapter and a processor in order to provide the excitation signal at the vent 750 and slot 748 during transmission and reception of data via the antenna created thereby. In order to operatively couple the feed PCB 768 to the edges of the vent 750 and slot 748, a feed spring contact pin 772 may be placed in contact with the excitation trace on the feed PCB 768 and a portion of the edge of vent 750. In the embodiment shown in FIG. 7, the point of contact between the feed spring contact pin 772 and the vent 750 may include an arm extending from a back surface of the vent 750. However, the present specification contemplates that the excitation signal may be provided at the vent 750 using any other structure. In an embodiment, the feed spring contact pin 772 may include a spring that is biased to contact the portion of the vent 750 so that during assembly of the bottom metal chassis 746 to the keyboard metal chassis 742, the spring of the feed spring contact pin 772 is forced into the feed spring contact pin 772 but made to, at least, semi-permanently contact the arm coupled to the edge of the vent 750 or to the edge of the vent 750 directly.

During operation of the antenna system described herein, the processor (e.g., 102, FIG. 1) may cause the wireless interface adapter (e.g., 120, FIG. 1) to send a transmission signal to the antenna system that includes the vent 750 and slot 748 as described. This transmission signal may be formed into a specific excitation signal either by a RF system (e.g., 130, FIG. 1), an antenna front end (e.g., 125, FIG. 1), an antenna adaption controller (e.g., 134, FIG. 1), or the feed PCB 768 depending on which of these elements are used to make such conversion to an RF signal. At this point the feed PCB 768 may send the excitation to the vent 750 via an excitation trace formed on the feed PCB 768 and the feed spring contact pin 772 as described herein. The excitation signal is then allowed to propagate around the edge circumference of the vent 750 to a determined length causing the vent 750 to radiate at a specific RF form the metal surfaces thereof. In an embodiment, the bottom metal chassis 746 may be made of MgAl, aluminum, or the like such that the signals may propagate around the edge circumference of the vent 750 to radiate the signal as described. Grounding wall, such as 744, may determine the length around the edge circumference of the vent 750 that RF excitation currents may travel.

The slot 748, being placed in an offset location in an embodiment, helps the surface excitation currents to travel along a relatively longer band partition on one side of the slot 748 on the side wall of the bottom metal chassis 746 so that the vent 750 may radiate at a lowest frequency (e.g., 2.4 GHz) while a shorter band partition on an opposite side of the slot 748 radiates at a higher frequency (e.g., 5 GHz) in some embodiments that are not a full loop antenna. Due to the specific placement of the slot 748 any RF may be emitted from the excitation of the vent 750 and the present specification contemplates these other arrangements of the slot 748 relative to the vent 750 and grounding wall 744 so as to emit, for example, a 2.412 GHz signal, a 5.47 GHz signal, a 6.465 GHz signal, or any other signal. In a specific embodiment, the emitted signal may be specific to emerging 5G and WiFi 6 technologies and those RF signals are contemplated in the present specification.

The present specification contemplates that the type of antenna formed by the excitation of the vent 750 and slot 748 as described herein may be implemented multiple times around the sidewalls of the bottom metal chassis 746 for plural antennas providing various frequency bands of wireless communications depending on location and dimensions of vents 750, slots 748, and grounding walls 744. Indeed, any number of audio vents and thermal vents used to pass sound and heated air out from the information handling system may be modified to operate as an antenna system. Indeed, by simultaneously using the audio vents and thermal vents as antenna systems in this way, space within the display housing (e.g., A-cover and B-cover) and base housing (C-cover (aka: keyboard metal chassis 742) and D-cover (aka: bottom metal chassis 746) may be saved for other hardware components while the look and feel of the information handling system is maintained. Additionally, because the lengths of these audio and thermal vents may be altered, the RFs emitted by the antennas created there may allow for current and future high speed data transmission frequencies to be used thereby increasing the amount of data that can be transmitted and received at the information handling system. Still further, the placement of the antenna at the vent 750 and slot 748 as described allows the antenna to be pushed to an outer side of the information handling system chassis thereby eliminating blockage of the RF signals emitted or interference, and provides for additional bandwidths to support the 6 GHz WiFi while concurrently enabling a seamless aesthetic look for the information handling system.

Figure 8A:
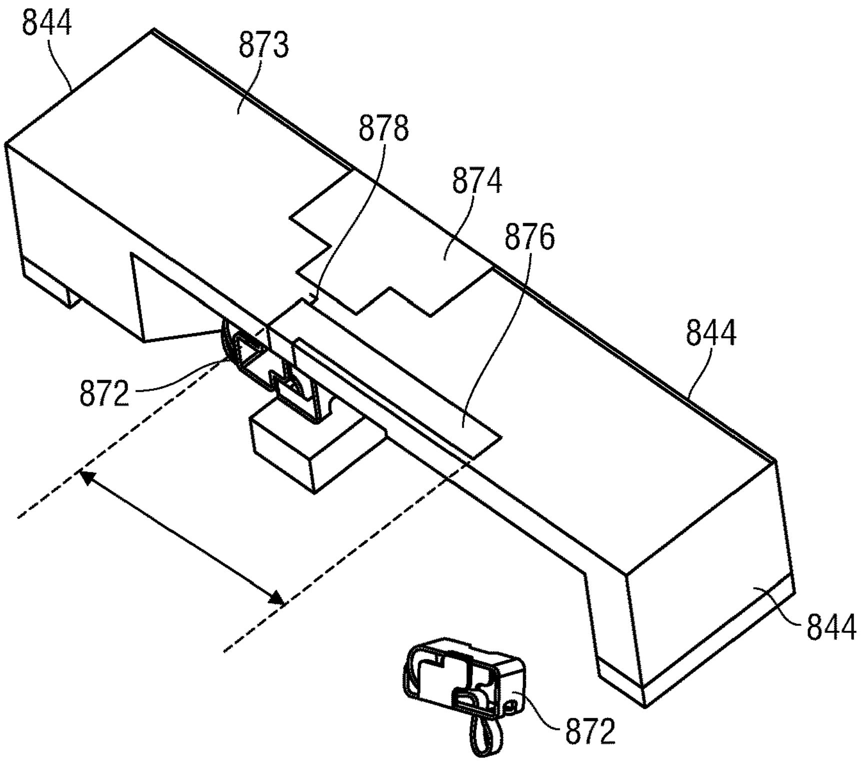
FIG. 8A is a graphical illustration top, perspective view of an antenna system within an audio vent to be placed in the bottom metal chassis according to an embodiment of the present disclosure.
Figure 8B:
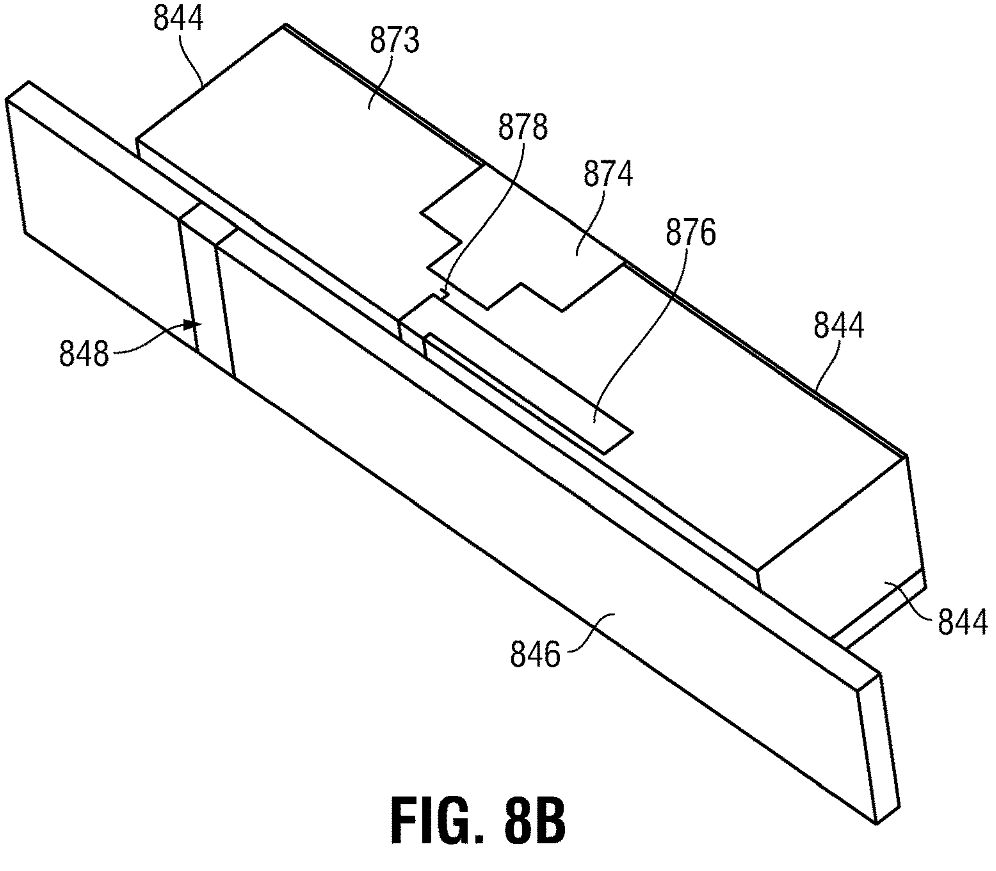
FIG. 8B is a graphical illustration top, perspective view of an antenna co-located with an audio vent and slot formed in the D-cover according to an embodiment of the present disclosure.
Figure 8C:
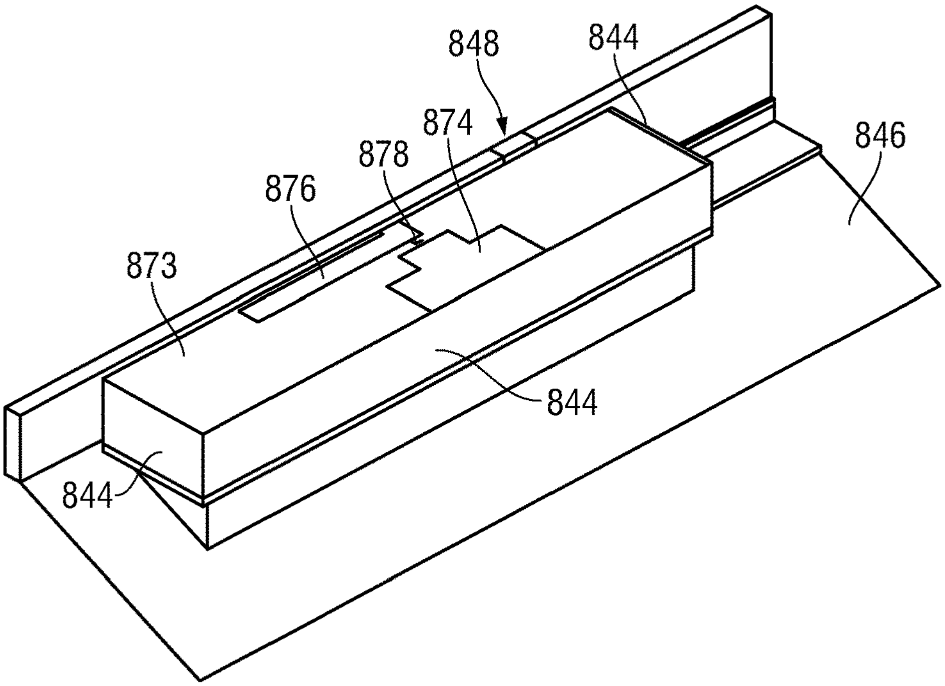
FIG. 8C is a graphical illustration top, perspective view of an antenna co-located with an audio vent and slot formed in the D-cover according to an embodiment of the present disclosure.
Figure 8D:
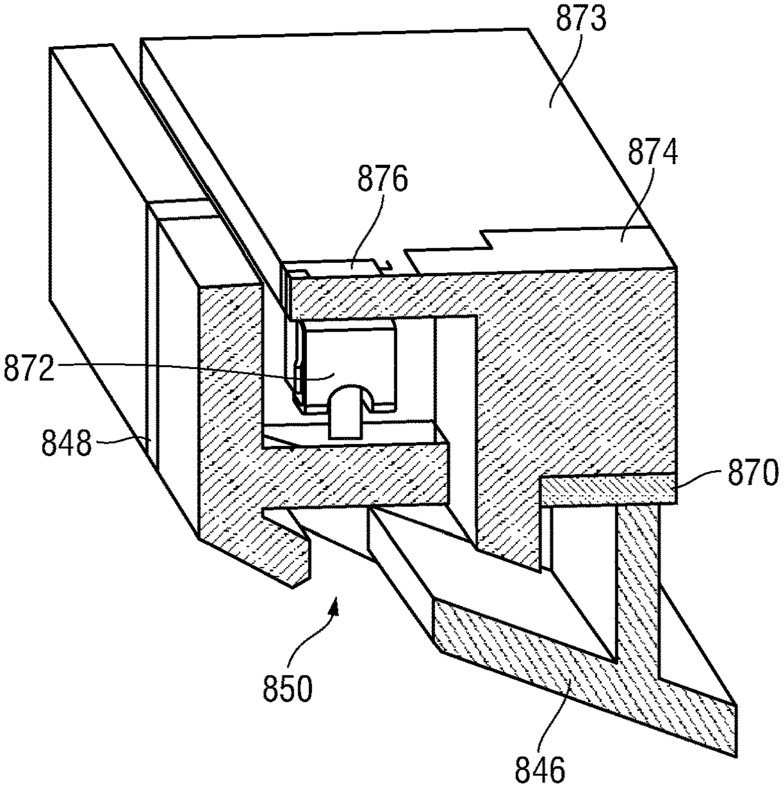
FIG. 8D is a graphical illustration cross cut, perspective view of an audio vent and a slot formed internal to the bottom metal chassis according to an embodiment of the present disclosure.
Figure 8E:
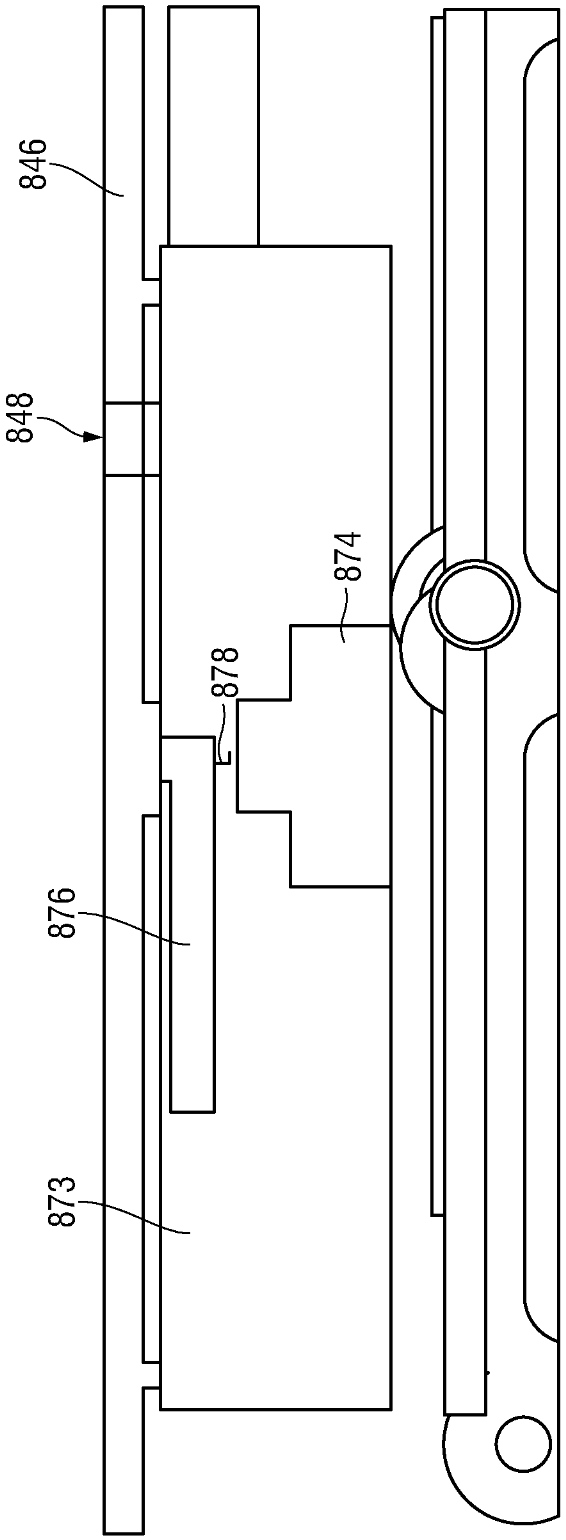
FIG. 8E is a graphical illustration top view of an audio vent and a slot formed internal to the bottom metal chassis according to an embodiment of the present disclosure.

FIG. 8A is a graphical illustration top, perspective view of an antenna system within an audio and RF feed encasement structure to be placed in the bottom metal chassis by an audio vent according to an embodiment of the present disclosure. Additionally, FIG. 8B is a graphical illustration top, perspective view of an antenna co-located with an audio vent and slot formed in the D-cover according to an embodiment of the present disclosure. Further, FIG. 8C is a graphical illustration top, perspective view of an antenna co-located with an audio vent and slot formed in the D-cover according to an embodiment of the present disclosure. Even further, FIG. 8D is a graphical illustration cross cut, perspective view of an audio vent and a slot formed internal to the bottom metal chassis according to an embodiment of the present disclosure. Still further, FIG. 8E is a graphical illustration top view of an audio vent and a slot formed internal to the bottom metal chassis according to an embodiment of the present disclosure. These figures (FIGS. 8A-8E) show an audio vent being used to facilitate a monopole antenna 876 along with an antenna vent 850, shown in FIG. 8D, similar to the thermal vent described in connection with FIG. 7.

With FIG. 8A, a speaker box 873 is shown. The speaker box 873 may be used within the system to mount a speaker (not shown) thereto and to direct sound out of a vent 850 (FIG. 8D). The inclusion of the speaker box 873 may allow for additional elements to be included with the antenna as well as a different arrangement of the elements described herein. For example, a feed PCB (not shown) may transmit the excitation signal to a feed excitation lead 878 formed on a top portion of the speaker box 873. In an embodiment, the feed excitation lead 878 and speaker box 873 may replace a portion of the feed PCB and the signal may be transmitted from the feed excitation lead 878 to provide an excitation signal to the monopole antenna 876. In this embodiment, the feed excitation lead 878 may pass through a portion of the speaker box 873 in order to be operatively coupled to the feed spring contact pin 872. In an embodiment, the feed excitation lead 878 may be operatively coupled to a feed PCB via a coaxial cable or some other electrical lead in order to provide the excitation signal at the feed excitation lead 878.

In an embodiment, the feed excitation lead 878 may also be operatively coupled to the vent 850 and slot 848 via a feed spring contact pin 872 to provide an excitation signal to a portion of the vent 850 or an arm protruding from the interior portion of the vent 850 as shown in FIG. 8A. In this embodiment of FIG. 8A, therefore, the length of the monopole antenna 876 may be configured so as to resonate at 5.1 GHz. Additionally, the excitation of the vent 850 and slot 848 via the feed excitation lead 878 and feed spring contact pin 872 may result in the emissions of various other frequencies such as 2.4 GHz as described in connection with FIG. 6, for example, along with other frequencies based on the placement of a grounding source around the edge of the circumference of the vent 850 as described herein.

FIG. 8A shows the feed spring contact pin 872 both as installed with the speaker box 873 and taken out for better perspective view of the feed spring contact pin 872 itself. Looking to the feed spring contact pin 872 pulled out from the speaker box 873, the feed spring contact pin 872 may include a pin that is biased out from a housing of the feed spring contact pin 872. This bias, as described herein, allows at least semi-permanent contact to the vent 850 such that during assembly the pin is forced against the vent 850 or arm of the vent. This ensures that the excitation signal received at the feed spring contact pin 872 from the feed excitation lead 878 may be transmitted to the vent 850 without the signal being severed due to jarring or other manipulations of the information handling system.

As described herein and turning to FIG. 8B, the monopole antenna 876 and vent 850 antenna may be accompanied by a number of grounding walls 844. The grounding walls 844 may be formed into the body of the bottom metal chassis 846, the body of the keyboard metal chassis 842, and/or along the outside of the speaker box 873 such that the mating of the bottom metal chassis 846 and a keyboard metal chassis. The grounding wall 844 operatively seals the vent 850 (FIG. 8D) and slot 848 (FIG. 8B) used as the antenna from the interferences that may be experienced due to the activation of the other hardware devices in the information handling system such as the processor, a hard drive, a keyboard, and the like. The grounding walls 844 may sandwich a conductive gasket 870 (FIG. 8D) between them or to a chassis such that any errant inductive or capacitive sources may be grounded away from the vent 850 and slot 848. The conductive gasket 870 may be made of any compressible conductive material that can redirect these errant inductive or capacitive emissions into the body of the bottom metal chassis 846 or keyboard metal chassis so as to not affect the operation of the antenna. In an embodiment, the conductive gasket 870 may further ground any inductive or capacitive emissions originating from, power systems, processors, other antennas, a cooling system, or speaker placed behind the vent 850 as described herein.

In the embodiments shown in FIGS. 8A-8D, the speaker box 873 may include a monopole antenna 876. The monopole antenna 876 may, along with the vent 850 and slot 848, to enhance the bandwidth across the higher-order frequencies. In a specific embodiment, the use of the monopole antenna 876 may allow for a 5.1 GHz RF mode and may be selectively activated to achieve those higher frequency ranges. In an embodiment, the monopole antenna 876 may be 10 mm long to achieve these RF ranges. Again, the monopole antenna 876 may be shorter or longer than, for example 10 mm, in order to achieve different RF ranges via different excitation signals.

FIGS. 8A through 8E also show a circuit soldering location 874. The circuit soldering location 874, in an embodiment, may be used to solder various electrical components of the wireless interface adapter (e.g., FIG. 3C, element 320) to the speaker box 873. In this embodiment, circuitry associated with an antenna front end (e.g., FIG. 3C, element 325), antenna adaption controller (e.g., FIG. 3C, element 334), and other circuitry used to provide an excitation signal at the feed excitation lead 878 and to the monopole antenna 876 and antenna formed by the vent 850 and slot 848.

As shown in FIGS. 8B, 8D, and 8E, the slot 848 may include an RF transparent material formed therein. This RF transparent material may include a plastic that is installed into the slot 848 using a NMT process. The vent 850, in these embodiments, however, is left open and the plastic filling the slot 848 may end where the slot 848 meets the vent 850. In these embodiments, the plastic is also placed into the slot 848 up until a terminal edge of the wall of the bottom metal chassis 846.

FIG. 8E shows a close-up view of the feed excitation lead 878 along with the feed trace 874 and monopole antenna 876 as described herein. In an embodiment, these elements may be formed using a flex PCB or laser direct structuring (LDS) plastic carrier among others with metal feed trace. It is appreciated, however, that these elements may be used in various embodiments used to transmit and alter the RF excitation signals (e.g., circuit soldering location 874, feed excitation lead 878). The RF excitation signals from the feed PCB may be passed to the feed spring contact pin 872 via the feed excitation lead 878 passing through the speaker box 873 and to the feed spring contact pin 872 placed within the speaker box 873 as shown in FIGS. 8A and 8D.

Figure 9:
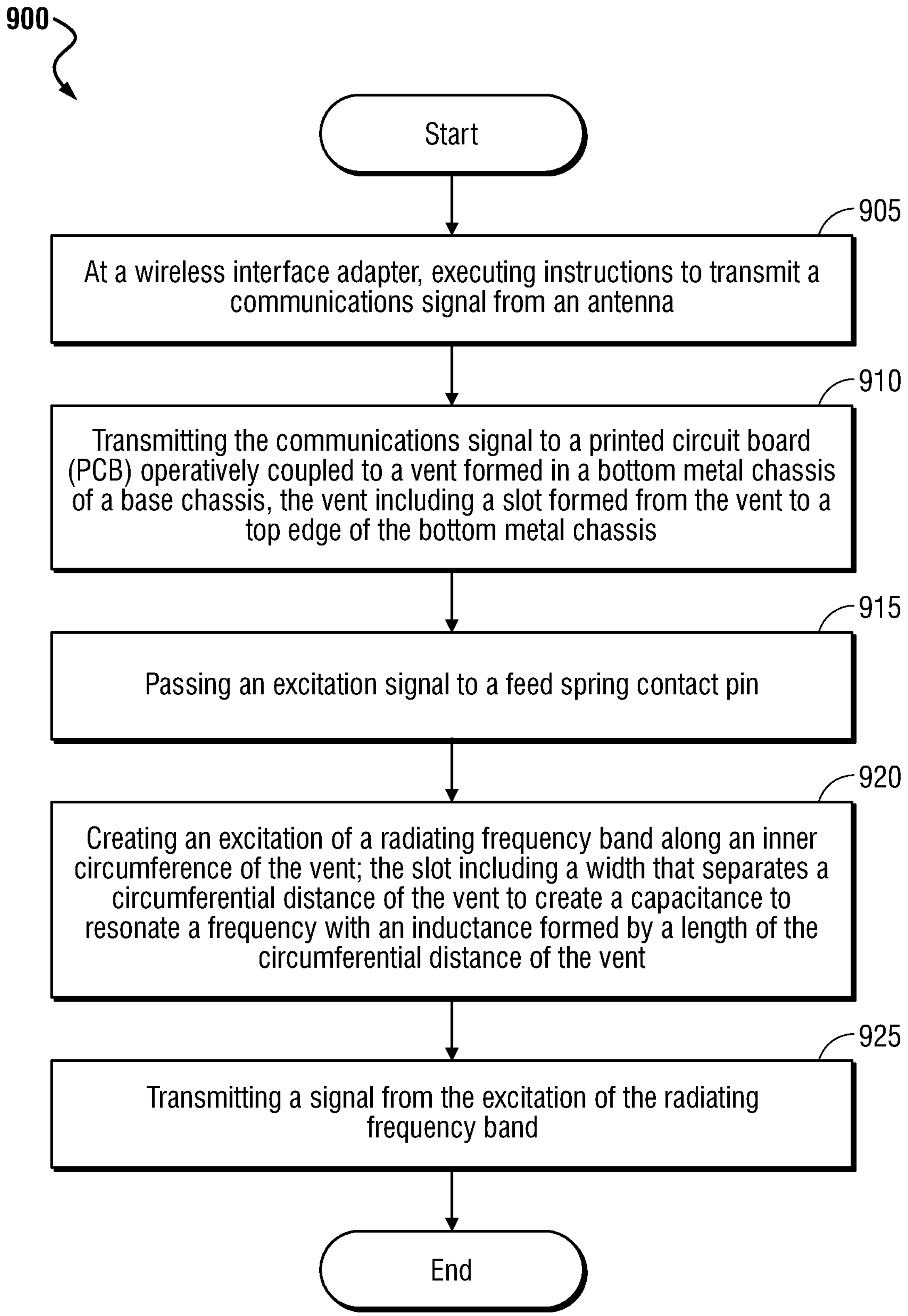
FIG. 9 is a flow diagram illustrating a method for operating an information handling system having an antenna co-located with a vent according to an embodiment of the present disclosure.

FIG. 9 is a flow diagram illustrating a method 900 for operating an information handling system having an antenna co-located with a vent according to an embodiment of the present disclosure. This co-location of the antenna with the vent is meant to be understood as the antenna being formed by the vent and slot formed between the vent and a terminal edge of the bottom metal chassis thereby using the audio or thermal vent of the information handling system for a second purpose. The method allows for the antenna system to be created in existing vents thereby decreasing the footprint otherwise used by an antenna system within the information handling system. By doing so, the space within the information handling system and, specifically, space within the display housing and base housing of a laptop-type or 360-degree type information handling system may be conserved.

The method 900 may begin with, at block 905, executing instructions to transmit a communications signal from an antenna using a wireless interface adapter. In an embodiment, these instructions may be executed by the processor of the information handling system. In an embodiment, these instructions may be executed by an antenna adaption controller associated with the wireless interface adapter. In an embodiment, the execution of these instructions may be completed partially by the processor of the information handling system and antenna adaption controller. In either example, the execution of the instructions causes a voltage at a certain current or currents to be applied to a feed excitation lead associated with a feed PCB or other signal feeding device or trace. As described herein, the signals sent to the vent may causes electromagnetic waves in any range of a RF on the EM spectrum.

At block 910, the communications signal may be transmitted to a feed PCB operatively coupled to a vent formed in a bottom metal chassis of a base chassis, the vent including a slot formed from the vent to a top edge of the bottom metal chassis. The feed PCB may include, in an embodiment, circuitry to convert the communications signal to an excitation signal used to excite the vent and slot as described herein. In another embodiment, the feed PCB may be used to transmit an excitation signal pre-converted from the communications signal sent from the processor. In either embodiment, the feed PCB may include any electrical traces that interface with the other components of the antenna as described herein.

The method 900 further includes, at block 915, passing the excitation signal to a feed spring contact pin. In an embodiment, the feed spring contact pin may include a spring that is biased to contact the portion of the vent so that during assembly of the bottom metal chassis to the keyboard metal chassis, the spring of the feed spring contact pin is forced into the feed spring contact pin but made to, at least, semi-permanently contact the arm coupled to the vent or the vent directly.

The method 900 may continue at block 920 with creating an excitation of a radiating frequency band along an inner circumference of the vent; the slot including a width that separates a circumferential distance of the vent to create a capacitance to resonate a frequency with an inductance formed by a length of the circumferential distance of the vent. By operatively coupling the feed PCB to the bottom metal chassis and the vent and slot formed therein, the vent and slot may operate as an antenna by allowing antenna surface currents to travel around an inner circumference of the vent with the slot. This builds a distributed capacitance that helps to tune and match the antenna tuning without the need for discrete lumped elements being soldered onto the structure of the base housing or bottom metal chassis driving the costs associated with, for example, forming surface mounted technology (SMT) parts on the bottom metal chassis. Due to the specific placement of the slot any RF may be emitted from the excitation of the vent and the present specification contemplates these other arrangements of the slot relative to the vent so as to emit, for example, a 2.412 GHz signal, a 5.47 GHz signal, a 6.465 GHz signal, or any other signal in various embodiments. In a specific embodiment, the emitted signal may be specific to emerging 5G and WiFi 6 technologies and those RF signals are contemplated in the present specification.

In an embodiment, altering the frequency band may be accomplished using, for example, a parasitic element operatively coupled to the vent and slot. The parasitic element, in this embodiment, may co-couple with the vent and slot to enhance the available antenna bandwidths across the higher-order frequencies. In an embodiment, the parasitic element may be used to affect the resonance of the RF EM waves produced by any monopole antenna and the antenna formed at the vent and slot. In a specific embodiment, the use of the parasitic element may allow for a 5.1 GHz RF mode and may be selectively activated to achieve those higher frequency ranges.

The method 900 also includes transmitting a signal from the excitation of the radiating frequency band from the vent at block 925. This transmission may also be accompanied by the reception of a signal from a source concurrently with the transmission or subsequently with the transmission. It is understood, therefore, that the antenna created by the excitation of the vent and slot can both transmit and receive data to and from, for example, an access point for various wireless protocols. Where no additional data is to be sent or received from the antenna, the method 900 may end here.

The blocks of flow diagram of FIG. 9 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data at an antenna comprising:

a processor;

a memory;

a power management unit;

a bottom metal chassis of a base housing containing components of the information handling system;

an audio vent formed into the bottom metal chassis used to interface with a speaker to resonate sound and for ventilating the bottom metal chassis, the audio vent having a vent aperture edge to serve as a radio frequency (RF) transmitter edge;

a slot formed between the vent aperture edge and a terminal edge of the bottom metal chassis to provide a gap in the vent aperture edge such that the distance around the remaining vent aperture edge is a tuned length specific to a radiating RF band; and an antenna located within the bottom metal chassis and behind the audio vent to, upon execution of the processor, generate the RF bands along the tuned length of the vent aperture edge of the audio vent.

2. The information handling system of claim 1 further comprising:

a keyboard metal chassis including a three-sided grounding wall to ground noise created by the radiated RF bands from the antenna.

3. The information handling system of claim 1 further comprising:

the antenna including a feed printed circuit board (PCB) operatively coupled to a metallic parasitic coupling element that is grounded to one of any number of grounding walls of the base housing and the vent via a spring contact pin; and the parasitic coupling element to change the directionality or pattern of the radiated RF signals from the antenna.

4. The information handling system of claim 1 further comprising:

an RF transparent material formed into the slot via a nano-molding technology (NMT) process.

5. The information handling system of claim 1, wherein the slot includes a width that separates a circumferential distance of the audio vent to create a capacitance to resonate a frequency with an inductance formed by a length of the circumferential distance of the audio vent.

6. The information handling system of claim 1, wherein the vent aperture edge of the audio vent is grounded at a circumferential distance from the gap in the vent aperture edge of one-half wavelength to radiate at 2.4 GHz.

7. The information handling system of claim 1 further comprising:

a wireless interface adapter including an antenna adaption controller to select power adjustments and adjustments to the antenna to modify antenna radiation patterns and operating parameters of a parasitic coupling element operatively coupled to the antenna.

8. The information handling system of claim 1, wherein the audio vent further includes a plastic barrier to direct sound waves produced by the speaker out of the audio vent.

9. A metallic base housing of an information handling system formed by coupling a bottom metal chassis with a keyboard metal chassis, the metallic based housing comprising:

a processor;

a memory;

a power management unit;

an audio vent formed into the bottom metal housing and used to interface with a speaker to resonate sound from the bottom metal chassis and transmit audio out of the audio vent and the audio vent having a vent aperture edge to serve as a radio frequency (RF) transmitter edge;

a slot formed along the vent aperture edge of the audio vent to provide a gap in the vent aperture edge such that the distance around the remaining vent aperture edge is a tuned length specific to a radiating RF band; and an antenna located within the bottom metal chassis and behind the vent to, upon execution of the processor, create radiating RF bands along the vent aperture edge of the audio vent.

10. The metallic base housing of claim 9 further comprising:

the keyboard metal chassis including a three-sided grounding wall of a keyboard metal chassis to ground noise created by the radiated RF bands from the antenna.

11. The metallic base housing of claim 9 further comprising:

the antenna including a feed printed circuit board (PCB) operatively coupled to a metallic parasitic coupling element that is grounded to one of any number of grounding walls of the metallic base housing via a spring contact pin; and the parasitic coupling element to change the directionality or pattern of the radiated RF signals from the antenna.

12. The metallic base housing of claim 9 further comprising:

an RF transparent material formed into the slot via a nano-molding technology (NMT) process.

13. The metallic base housing of claim 9, wherein the vent aperture edge of the audio vent is grounded from the gap in the vent aperture edge such that the tuned length specific to the radiating RF band is at a circumferential distance of one-half wavelength to radiate at 2.4 GHz.

14. The metallic base housing of claim 9 further comprising:

a wireless interface adapter including an antenna adaption controller to select power adjustments and adjustments to the antenna to modify antenna radiation patterns and operating parameters of a parasitic coupling element operatively coupled to the antenna.

15. An information handling system to transmit a communication signal comprising:

a base housing metal chassis containing components of the information handling system including a processor, a memory, a power management unit, and an antenna, wherein the base housing metal chassis includes a bottom metal chassis and a keyboard metal chassis;

an audio and thermal vent formed into the keyboard metal chassis used to interface with a speaker to resonate sound and to vent heat from the interior of the base housing metal chassis heated air and the audio and thermal vent having a vent aperture edge to serve as a radio frequency (RF) transmitter edge; and a slot formed between the vent aperture edge and a terminal edge of the bottom metal chassis to provide a gap in the vent aperture edge such that the distance around the remaining vent aperture edge is a tuned length specific to a radiating RF band, wherein the antenna is placed behind the audio and thermal vent to, upon execution of the processor, create radiating RF bands along the vent aperture edge of the audio and thermal vent based on a position of a ground around the vent aperture edge of the audio and thermal vent.

16. The information handling system of claim 15 further comprising:

the keyboard metal chassis includes a three-sided grounding wall to ground noise created by the radiated RF bands from the antenna.

17. The information handling system of claim 15 further comprising:

the antenna including a feed printed circuit board (PCB) operatively coupled to a metallic parasitic coupling element that is grounded to one of any number of grounding walls of the base housing metal chassis via a spring contact pin; and the parasitic coupling element to change the directionality or pattern of the radiated RF signals from the antenna.

18. The information handling system of claim 15, wherein the slot includes a width of the gap that separates a circumferential distance of the vent aperture edge to create a capacitance to resonate a frequency with an inductance formed by a length of the circumferential distance of the vent aperture edge.

19. The information handling system of claim 15, wherein the perimeter of the vent aperture edge of the audio and thermal vent are grounded from the gap in the vent aperture edge such that the tuned length specific to the radiating RF band is at a circumferential distance of one-half wavelength to radiate at 2.4 GHz.

20. The information handling system of claim 15, further comprising:

an RF transparent material formed into the slot via a nano-molding technology (NMT) process.

* * * * *